US011605533B2

(12) United States Patent
MacGregor et al.

(10) Patent No.: US 11,605,533 B2
(45) Date of Patent: Mar. 14, 2023

(54) METHODS FOR ALIGNING A LIGHT SOURCE OF AN INSTRUMENT, AND RELATED INSTRUMENTS

(71) Applicant: bioMerieux, Inc., Durham, NC (US)

(72) Inventors: Ian MacGregor, Merrimack, NH (US); Scott Collins, Westford, MA (US); Jo-ann Loh, Nashua, NH (US); Spencer Lovette, Mount Vernon, NH (US); Andrew J. Violette, Bedford, NH (US); James VanGordon, O'Fallon, MO (US); Jared Bullock, Saint Louis, MO (US)

(73) Assignee: bioMerieux, Inc., Durham, NC (US)

( * ) Notice: Subject to any disclaimer, the term of this patent is extended or adjusted under 35 U.S.C. 154(b) by 0 days.

(21) Appl. No.: 16/299,217

(22) Filed: Mar. 12, 2019

(65) Prior Publication Data
US 2019/0287780 A1 Sep. 19, 2019

Related U.S. Application Data

(60) Provisional application No. 62/642,728, filed on Mar. 14, 2018.

(51) Int. Cl.
H01J 49/16 (2006.01)
H01J 49/04 (2006.01)
H01J 49/02 (2006.01)
G01B 11/00 (2006.01)
H01J 49/00 (2006.01)

(52) U.S. Cl.
CPC ............ *H01J 49/164* (2013.01); *G01B 11/00* (2013.01); *H01J 49/0031* (2013.01); *H01J 49/025* (2013.01); *H01J 49/0418* (2013.01)

(58) Field of Classification Search
CPC ...... H01J 49/164; H01J 49/161; H01J 49/162; H01J 49/0418
See application file for complete search history.

(56) References Cited

U.S. PATENT DOCUMENTS 5,629,518 A * 5/1997 Grotheer ............. H01J 49/0422
250/287
5,770,859 A 6/1998 Bielawski
(Continued)

OTHER PUBLICATIONS

Notification of Transmittal of the International Search Report and the Written Opinion of the International Searching Authority, or the Declaration, in corresponding PCT Application No. PCT/US19/21801 (dated May 28, 2019).
(Continued)

*Primary Examiner* — Sean M Luck
(74) *Attorney, Agent, or Firm* — Myers Bigel, P.A.

(57) ABSTRACT

Methods for an instrument including a light source of are provided. A method for an instrument including a light source includes providing light from the light source to a target location in a process chamber. The method includes receiving the light at a sensor. The method includes determining, using data from the sensor, a first position of the light at the target location. Moreover, the method includes determining whether to adjust the light to a second position at the target location. Related instruments are also provided.

20 Claims, 17 Drawing Sheets

(56) References Cited

U.S. PATENT DOCUMENTS

| | | | |
|---|---|---|---|
| 5,965,884 A * | 10/1999 | Laiko | H01J 49/164 250/288 |
| 6,614,021 B1 | 9/2003 | Kalinitchenko | |
| 6,765,217 B1 * | 7/2004 | Nishimura | G01N 23/225 250/491.1 |
| 7,180,058 B1 * | 2/2007 | Izgarian | H01J 27/24 250/281 |
| 8,735,810 B1 | 5/2014 | Vestal | |
| 9,048,075 B1 * | 6/2015 | Kodera | H01J 49/403 |
| 9,536,726 B2 | 1/2017 | Vangordon et al. | |
| 2002/0191864 A1 * | 12/2002 | Lennon | G06T 7/70 382/288 |
| 2004/0183006 A1 | 9/2004 | Reilly et al. | |
| 2005/0045815 A1 * | 3/2005 | Bui | H01J 49/0418 250/282 |
| 2006/0207115 A1 | 9/2006 | Truche et al. | |
| 2007/0102632 A1 * | 5/2007 | Overney | H01J 49/0004 250/288 |
| 2008/0272286 A1 * | 11/2008 | Vestal | B08B 1/00 250/282 |
| 2010/0044563 A1 | 2/2010 | Harada et al. | |
| 2010/0116982 A1 * | 5/2010 | Iwamoto | H01J 49/4295 250/292 |
| 2010/0123075 A1 * | 5/2010 | Dantus | H01J 49/0059 250/282 |
| 2010/0294928 A1 * | 11/2010 | Bunton | H01J 49/164 250/307 |
| 2011/0155901 A1 | 6/2011 | Vestal | |
| 2013/0146778 A1 | 6/2013 | Nuetzel et al. | |
| 2013/0240907 A1 | 9/2013 | Nutzel et al. | |
| 2015/0008313 A1 * | 1/2015 | Loboda | H01J 49/164 250/282 |
| 2015/0048245 A1 | 2/2015 | Vestal et al. | |
| 2016/0141166 A1 * | 5/2016 | Toriumi | H01J 49/0418 250/288 |

OTHER PUBLICATIONS

Li et al. "Performance of a New 235 nm UV-LED-Based On-Capillary Photometric Detector" Anal. Chem. 88 (24):12116-12121 (2016).

Vestal et al. "High Performance MALDI-TOF mass spectrometry for proteomics" International Journal of Mass Spectrometry 268(12):183-92 (2007).

Wiley et al. "Time-of-Flight Mass Spectrometer with Improved Resolution" The Review of Scientific Instruments 26 (12):11150-1157(1955).

* cited by examiner

METHODS FOR ALIGNING A LIGHT SOURCE OF AN INSTRUMENT, AND RELATED INSTRUMENTS

RELATED APPLICATIONS

This application claims the benefit of and priority to U.S. Provisional Application Ser. No. 62/642,728, filed Mar. 14, 2018, the contents of which are hereby incorporated by reference as if recited in full herein.

FIELD

The present invention relates to mass spectrometers and other systems for which isolation from a user is desirable.

BACKGROUND

Mass spectrometers are devices that ionize a sample and then determine the mass-to-charge ratios of the collection of ions formed. One well-known mass spectrometer is the Time-Of-Flight Mass Spectrometer (TOFMS), in which the mass-to-charge ratio of an ion is determined by the amount of time required for that ion to be transmitted under the influence of electric fields (e.g., pulsed or static electric fields) from the ion source to a detector. The spectral quality in the TOFMS reflects the initial conditions of the ion beam prior to acceleration into a field free drift region. Specifically, any factor that results in ions of the same mass having different kinetic energies and/or being accelerated from different points in space may result in a degradation of spectral resolution and, thereby, a loss of mass accuracy.

Matrix-Assisted Laser Desorption Ionization (MALDI) is a well-known method to produce gas-phase biomolecular ions for mass spectrometric analysis. The development of Delayed Extraction (DE) for MALDI-TOF has made high-resolution analysis routine for MALDI-based instruments. In DE-MALDI, a short delay is added between the ionization event, triggered by the laser, and the application of the accelerating pulse to the TOF source region. The fast (i.e., high-energy) ions will travel farther than the slow ions, thereby transforming the energy distribution upon ionization to a spatial distribution upon acceleration (in the ionization region prior to the extraction pulse application).

See U.S. Pat. Nos. 5,625,184, 5,627,369, 5,760,393, and 9,536,726. See also, Wiley et al., *Time-of-flight mass spectrometer with improved resolution*, Review of Scientific Instruments vol. 26, no. 12, pp. 1150-1157 (2004); M. L. Vestal, *Modern MALDI time-of-flight mass spectrometry*, Journal of Mass Spectrometry, vol. 44, no. 3, pp. 303-317 (2009); Vestal et al., *Resolution and mass accuracy in matrix-assisted laser desorption ionization-time-of-flight*, Journal of the American Society for Mass Spectrometry, vol. 9, no. 9, pp. 892-911 (1998); and Vestal et al., *High Performance MALDI-TOF mass spectrometry for proteomics*, International Journal of Mass Spectrometry, vol. 268, no. 2, pp. 83-92 (2007). The contents of these documents are hereby incorporated by reference as if recited in full herein.

SUMMARY

Embodiments of the present invention are directed to methods for aligning a light source of an instrument. A method for an instrument including a light source may include providing light from the light source to a target location in a process chamber. The method may include receiving the light at a sensor. The method may include determining, using data from the sensor, a first position of the light at the target location. Moreover, the method may include determining whether to adjust the light to a second position at the target location.

In some embodiments, the light source may include a laser. The providing light may include providing the light from the laser to a reflecting surface that reflects the light from the laser to the target location. Moreover, the method may include adjusting a tilt of the reflecting surface to adjust the light from the laser to the second position at the target location.

In some embodiments, the laser may be an UltraViolet (UV) laser. The adjusting the tilt of the reflecting surface may be performed while the target location includes a location that is free of any sample thereon. Moreover, the method may include performing, using the UV laser, sample ionization of a sample on a sample slide in the process chamber.

In some embodiments, the adjusting the tilt may include electronically directing an actuator coupled to the reflecting surface to adjust the tilt. Moreover, the method may include calibrating movement of the actuator by using the sensor to determine pixel change resultant from forward or reverse operation of the actuator.

In some embodiments, the adjusting the tilt may include aligning the light with at least one aperture of a charged-particle optics system of the instrument. Moreover, the method may include moving an x-y stage including the target location thereon, to align a fiducial feature of the stage with the light and with the at least one aperture of the charged-particle optics system, after adjusting the tilt.

In some embodiments, an end portion of the process chamber may include a window that is between the target location and the sensor. Moreover, the receiving the light may include receiving the light at the sensor through the window of the end portion of the process chamber.

In some embodiments, the sensor may be, or may include a sensor of, a camera that views the light. The method may include determining a size of the light on the target location in pixels in an image captured by the camera. The method may include focusing the light on the target location by adjusting the size of the light on the target location. Additionally or alternatively, the instrument may be a mass spectrometer, and the method may include determining, via the camera, whether a sample slide is present on an x-y stage of the mass spectrometer.

In some embodiments, the method may include aligning the light with at least one aperture of an ion optics system of the instrument. Moreover, the method may include moving an x-y stage including the target location thereon, to align a fiducial feature of the x-y stage with the light and with the at least one aperture of the ion optics system.

A method for aligning a laser of a mass spectrometer may, according to some embodiments, include providing a laser beam from the laser to a target location in an ionization chamber. The method may include capturing an image of the laser beam with a camera. The method may include determining, using the image captured by the camera, a first position of the laser beam at the target location. The method may include determining whether to adjust the laser beam to a second position at the target location. Moreover, the method may include adjusting the laser beam to the second position at the target location.

In some embodiments, an end portion of the ionization chamber may include a window that is between the target location and the camera. Moreover, the capturing the image of the laser beam may include capturing the image of the laser beam at the camera through the window of the ionization chamber. In some embodiments, the laser beam that is captured by the camera may pass from at least one reflecting surface and/or lens to the camera through at least one ion optics aperture. Additionally or alternatively, the capturing the image of the laser beam may include capturing an image of a laser spot of the laser beam at a defined location in the ionization chamber while the ionization chamber is closed and under vacuum pressure.

An instrument, according to some embodiments, may include a light source. The instrument may include a chamber enclosing a target location for light of the light source. The instrument may include a sensor configured to receive the light. Moreover, the instrument may include a processor configured to determine, using data from the sensor, a first position of the light at the target location. The processor may be further configured to determine whether to adjust the light to a second position at the target location.

In some embodiments, the light source may include an UltraViolet (UV) laser. Moreover, the instrument may include a reflecting surface that is configured to reflect the light from the UV laser to the target location. The instrument may also include an actuator coupled to the reflecting surface and configured to adjust a tilt of the reflecting surface to adjust the light from the UV laser to the second position at the target location.

In some embodiments, the UV laser may be configured to perform ionization of a sample on a sample slide in the chamber, and the chamber may be under vacuum pressure. Moreover, an end portion of the chamber may include a window that is between the target location and the sensor. Additionally or alternatively, the sensor may be, or may include a sensor of, a camera that is configured to view the light.

In some embodiments, the instrument may be a mass spectrometer, and the processor may be configured to use data from the camera to determine whether a sample slide is present on an x-y stage of the mass spectrometer. The x-y stage may have a base plate with a circular open aperture that is between the camera and the ion optics system.

In some embodiments, the instrument may include an ion optics system including at least one aperture. The instrument may include an x-y stage including the target location thereon. Moreover, the processor may be configured to control movement of the x-y stage to align a fiducial feature of the x-y stage with the light and with the at least one aperture of the ion optics system.

In some embodiments, the instrument may be a mass spectrometer, the light source may include a laser of the mass spectrometer, the light may include a laser beam of the laser, and the chamber may include an ionization chamber of the mass spectrometer. Moreover, the mass spectrometer may include a reflecting surface. The reflecting surface may be configured to reflect the laser beam from the laser to the target location. The sensor may be, or may include a sensor of, a camera that is configured to capture an image of the laser beam. The processor may be configured to control adjustment of a tilt of the reflecting surface to adjust the laser beam to the second position at the target location.

Further features, advantages, and details of the present invention will be appreciated by those of ordinary skill in the art from a reading of the figures and the detailed description of the example embodiments that follow, such description being merely illustrative of the present invention.

It is noted that aspects of the invention described with respect to one embodiment may be incorporated in a different embodiment although not specifically described relative thereto. That is, all embodiments and/or features of any embodiment can be combined in any way and/or combination. Applicant reserves the right to change any originally-filed claim or file any new claim accordingly, including the right to be able to amend any originally-filed claim to depend from and/or incorporate any feature of any other claim although not originally claimed in that manner. These and other objects and/or aspects of the present invention are explained in detail in the specification set forth below.

DETAILED DESCRIPTION

The present invention now will be described more fully hereinafter with reference to the accompanying drawings, in which illustrative embodiments of the invention are shown. Like numbers refer to like elements and different embodiments of like elements can be designated using a different number of superscript indicator apostrophes (e.g., 10, 10', 10", 10''').

Conventional laser alignment processes may use a custom tool that fits in the place of ion optics inside the acquisition/ionization chamber of a mass spectrometer. The use of such a tool may require the chamber to be open to atmospheric pressure during laser alignment, thus exposing the user to a potential laser safety hazard and increasing the time to reach operating pressure (e.g., vacuum pressure) after laser alignment is complete. The longer the chamber is exposed to atmospheric pressure, the longer it will take to reach operating pressure. According to embodiments of the present invention, however, a laser (or other light source) may be aligned even while the chamber is closed and under vacuum pressure, thus protecting the user from a potential laser safety hazard and reducing/eliminating the venting and pump-down time from the process. Generally stated, a light source may be focused on a spot inside the chamber.

Figure 1A:
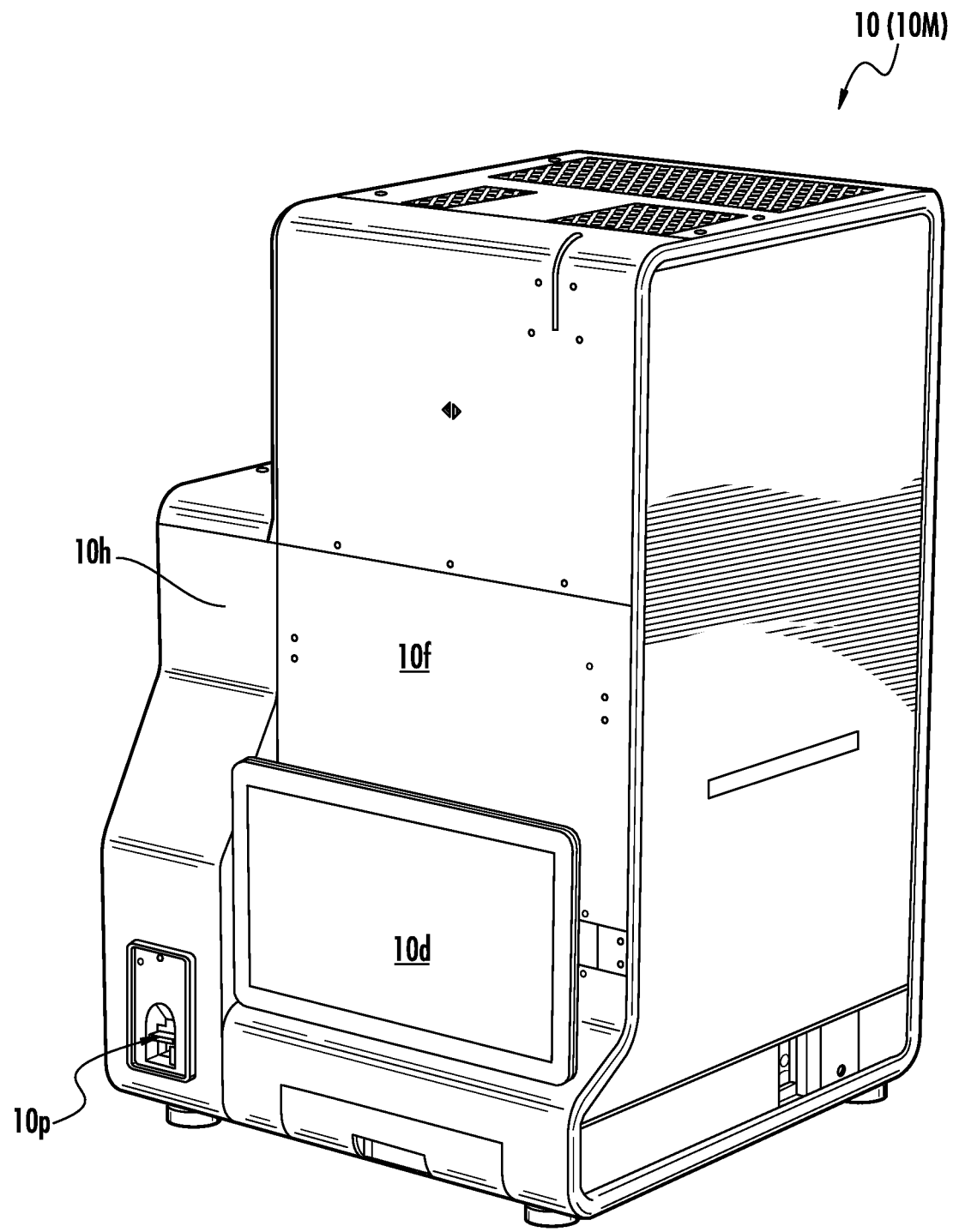
FIG. 1A is a perspective view of an instrument, according to embodiments of the present invention.
Figure 1B:
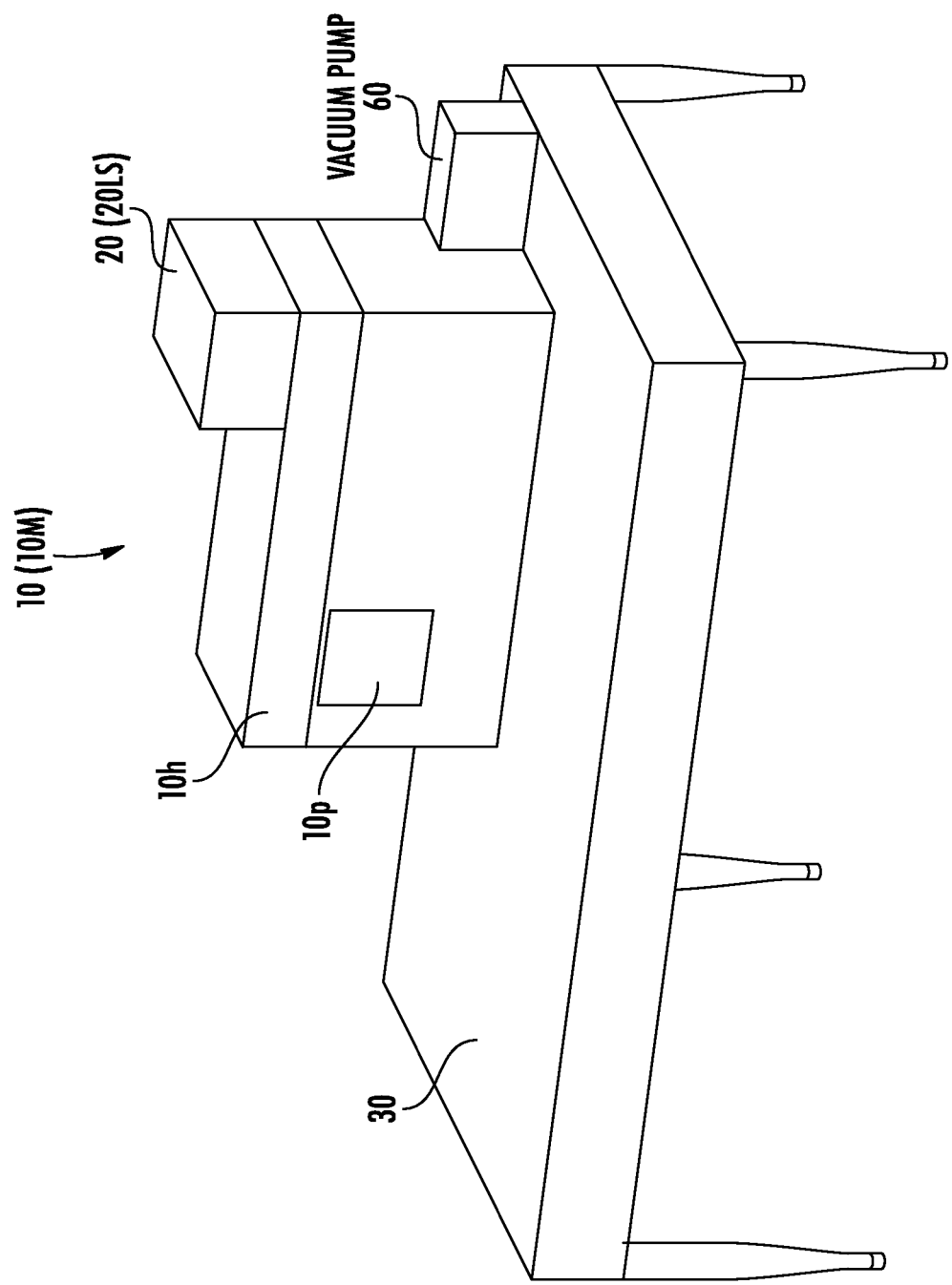
FIG. 1B is a perspective view of an instrument and a light source, according to embodiments of the present invention.

FIG. 1A and FIG. 1B illustrate an example instrument 10, such as a mass spectrometer 10M. As shown in FIG. 1A, the instrument 10 includes a housing 10h with a front wall 10f having a display 10d with a user interface. The housing 10h also has at least one sample specimen entry port 10p that can be sized and configured to receive slides. One or more ports 10p may be used. Each port 10p can be configured as entry-only, exit-only, or as both an entry- and exit-port for specimen slides (e.g., for a sample plate 230 of FIG. 2A) for analysis.

As shown in FIG. 1B, an instrument 10 may use at least one light source 20, according to embodiments of the present invention. In some embodiments, the instrument 10 may be a mass spectrometer 10M, and the housing 10h may include at least one sample specimen entry port 10p configured to receive slides for the mass spectrometer 10M. For example, the mass spectrometer 10M may be a table top mass spectrometer, as shown by the table 30. Moreover, one or more portions of the instrument 10 may be pumped/evacuated via a vacuum pump 60 to a desired pressure. The vacuum pump 60 and/or the light source 20 may be on board (e.g., inside) the housing 10h or may be provided as an external plug-in component to the instrument 10.

The at least one light source 20 can provide light to generate ions inside the instrument 10. For example, the light source 20 may comprise a laser 20LS that supplies laser light to the instrument 10. As an example, the laser 20LS may be a solid state laser, such as an UltraViolet (UV) laser with a wavelength above 320 nanometers (nm). In some embodiments, the solid state laser 20LS can generate a laser beam with a wavelength between about 347 nm and about 360 nm. The solid state laser 20LS can alternatively be an infrared laser or a visible light laser.

Moreover, although the terms "light source" and "laser" are used to discuss examples herein, the light source 20 may comprise any type of source that generates charged particles inside the instrument 10 by supplying light/energy to a target/device inside the instrument 10. For example, the light source 20 may be configured to provide one of various types of pulses of light/energy to a sample plate 230 (FIG. 2A) in the instrument 10 to generate a pulse of charged particles. The light source 20 may be a focused light source or a collimated light source.

In some embodiments, the light source 20 and the sample plate 230 may collectively (or even individually) be referred to as an "ion source," as light from the light source 20 may be directed to the sample plate 230 to generate ions. As an example, the sample plate 230 may be referred to herein as a "sample slide" that can be analyzed by the instrument 10, and the light source 20 may be configured to perform sample ionization at the sample slide 230.

Figure 2A:
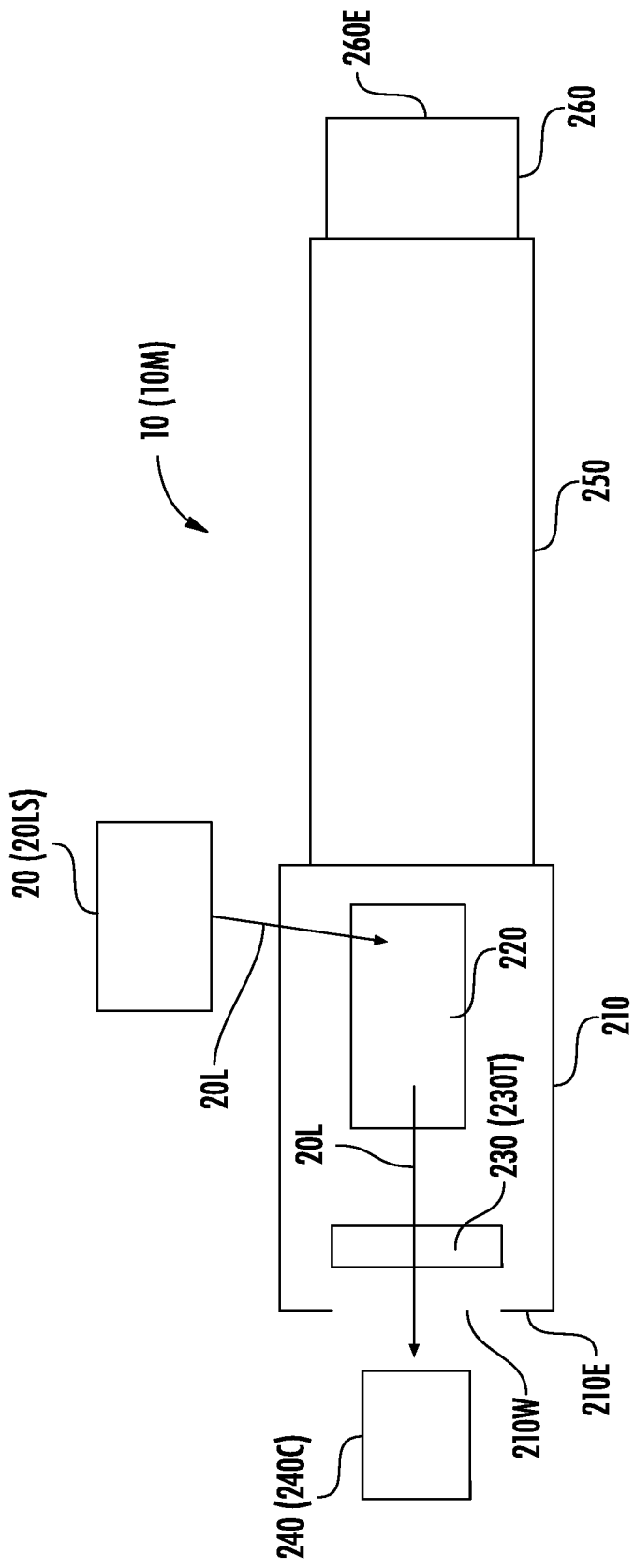
FIG. 2A illustrates a schematic diagram of an instrument and a light source, according to embodiments of the present invention.

FIG. 2A illustrates a schematic diagram of an instrument 10 and a light source 20. The instrument 10 includes a chamber 210, which may be an "acquisition chamber," a "process chamber," a "vacuum chamber," a "chamber under vacuum," or a "chamber in vacuum." Inside the chamber 210 are a sample plate 230 (or other target location 230T) and an ion optics system 220, which may also be referred to herein as "ion optics" or an "ion optics assembly." The sample plate 230 may be a target for light/energy 20L of the light source 20. The chamber 210, while under vacuum pressure, may enclose the sample plate 230.

The ion optics system 220 may be configured to receive light/energy 20L from the light source 20, and to direct the light/energy 20L to the sample plate 230. The light/energy 20L can cause the sample plate 230 to generate ions that pass through the ion optics system 220, through a flight tube 250, and onto a detector 260. As illustrated in FIG. 2A, the sample plate 230 may be adjacent a first end 210E of the acquisition chamber 210. The first end 210E of the acquisition chamber 210 and a second end 260E of the detector 260 may be on opposite ends/portions of the instrument 10.

A sensor 240 adjacent the first end 210E may be configured to receive the light/energy 20L. For example, the sensor 240 may be a camera 240C (or may be a sensor of a camera 240C) that is configured to view, and capture an image of, the light/energy 20L.

Figure 2B:
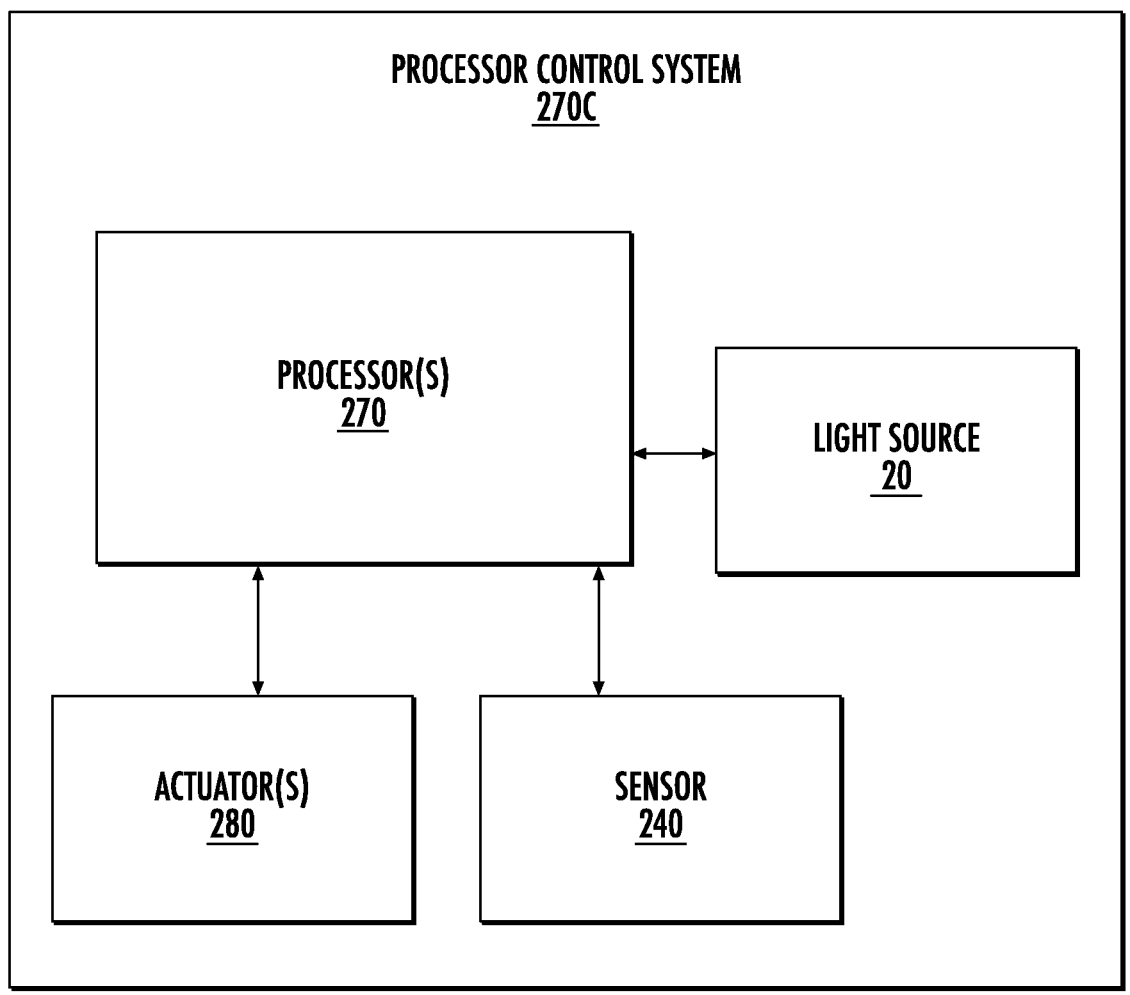
FIG. 2B illustrates a block diagram of a processor control system of the instrument of FIG. 2A, according to embodiments of the present invention.
Figure 2C:
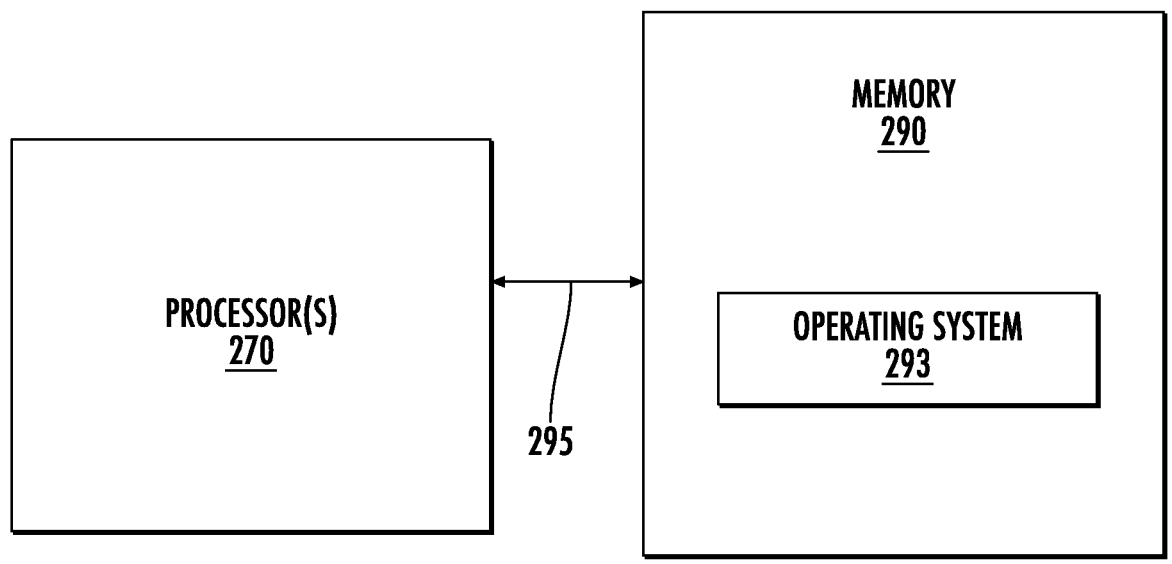
FIG. 2C illustrates a block diagram of an example processor and memory that may be used in accordance with embodiments of the present invention.
Figure 2D:
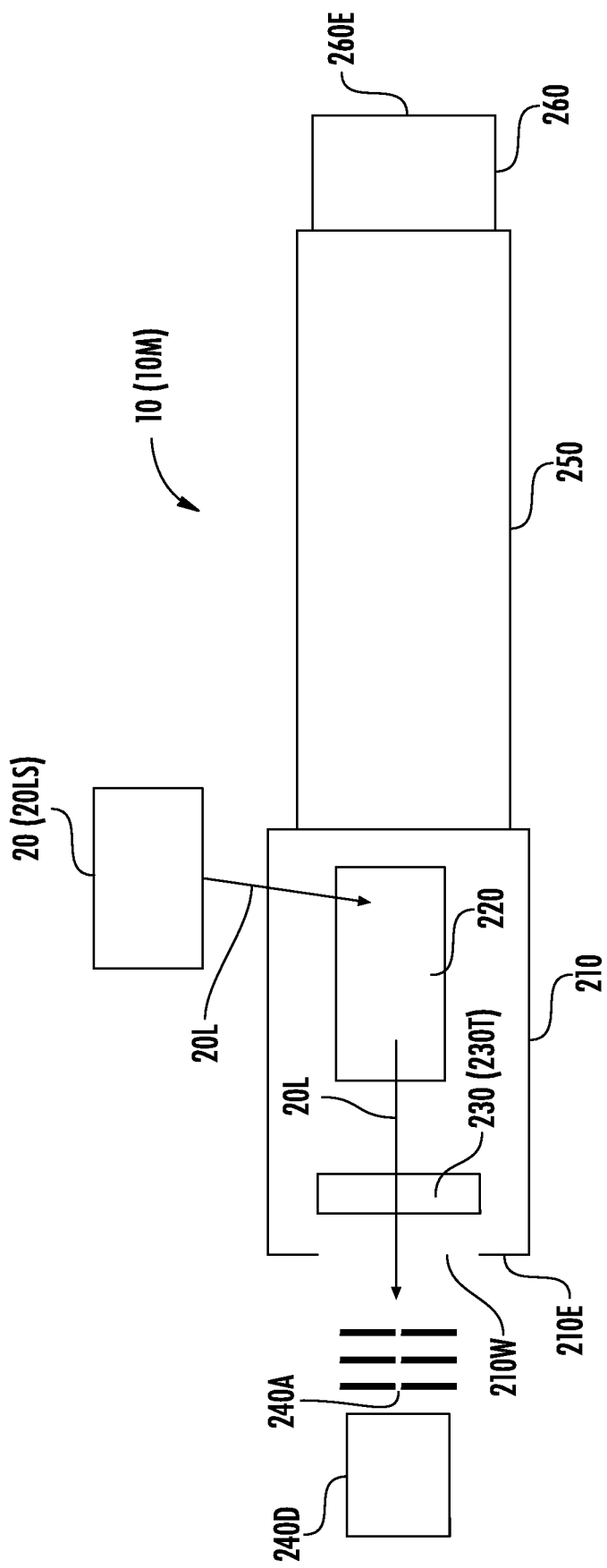
FIG. 2D illustrates a schematic diagram of an instrument and a light source, according to embodiments of the present invention.

Although the camera 240C is described in some examples herein, the sensor 240 may instead be a photodiode or other optical sensor/detector 240D, and a small aperture 240A (or series of apertures 240A) may be used in the place of the camera 240C, as illustrated in FIG. 2D. For example, the aperture(s) 240A can be arranged such that a signal is generated by the photodiode (or other optical sensor/detector 240D) only when the light/energy 20L passes through the aperture(s) 240A. If parallax error is of concern, then a series of apertures 240A may be advantageous.

Each aperture 240A can have a diameter/length between 50 micrometers (μm) and 2 millimeters (mm). The apertures 240A, however, are not necessarily the same size. Rather, different apertures 240A can have different sizes, respectively, in the range of 50 μm-2 mm. Although FIG. 2D illustrates a series of three apertures 240A, a different number (e.g., two, four, or more) of apertures 240A may be in a series.

In some embodiments, the light/energy 20L may pass through a window 210W on the first end 210E to be incident on the sensor 240. The window 210W, which may be between the target 230T and the sensor 240, may include optically-transmissive glass, plastic, and/or another material or an open space that allows the light/energy 20L to pass to the sensor 240.

Moreover, in some embodiments, the instrument 10 may be a mass spectrometer 10M and the target 230T may be a sample slide 230, and a processor 270 (FIG. 2B) may be configured to use data from the camera 240C to determine whether the sample slide 230 is present on an x-y stage 315 (FIG. 3A) of the mass spectrometer 10M.

The ion optics system 220 inside the chamber 210 may include components such as an extraction plate and a back bias plate. Moreover, the ion optics system 220 may include a deflector plate, which may, in some embodiments, be omitted or removable from the ion optics system 220.

Although some examples herein describe a sample on a sample plate 230, the light 20L may, in some embodiments, be directed to a test plate or other target 230T instead of the sample plate 230. For example, during operations of aligning the light 20L of the light source 20 with respect to a target 230T, it may be desirable to provide the light 20L inside the chamber 210 in the absence of any sample. Accordingly, the sample plate 230 may be absent from the chamber 210, or may be a blank/test slide, during alignment. The target 230T may thus be a position/region/location inside the chamber 210 where a sample would otherwise typically be found during normal operation.

Additionally or alternatively, the combination of the light source 20, the sensor 240, and the chamber 210 may, in some embodiments, be referred to as a "system," such as an alignment system. Moreover, as the sensor 240 may be outside of the vacuum chamber 210, the sensor 240 may be at atmospheric pressure.

In addition to the light source 20 and the sensor 240, a reflecting surface 312 (FIG. 3A) of the instrument 10 may also be outside the vacuum chamber 210. In some embodiments, the reflecting surface 312 may be actuated, whereas another reflecting surface 313 (FIG. 3A) of the instrument 10 may be stationary. Accordingly, the reflecting surface 312 may be both actuated, such as by one or more actuators 280 (FIG. 2B), and outside the chamber 210.

FIG. 2B illustrates a block diagram of a processor control system 270C. The processor control system 270C may include one or more processors 270, which may be internal and/or external to the instrument 10. The processor(s) 270 may be configured to communicate with the light source 20, the sensor 240, and/or one or more actuators 280 (e.g., piezoelectric actuators or stepper motors) of the instrument 10. For example, the processor(s) 270 may be configured to receive and process data from the sensor 240, and operations of the light source 20 and/or the actuator(s) 280 may be performed under the control of the processor(s) 270. As an example, a processor 270 may be configured to determine, using data from the sensor 240, a first position of the light 20L at the target 230T, and to determine whether to adjust the light 20L to a second position at the target 230T.

FIG. 2C illustrates a block diagram of an example processor 270 and memory 290 that may be used in accordance with various embodiments of the invention. The processor 270 communicates with the memory 290 via an address/data bus 295. The processor 270 may be, for example, a commercially available or custom microprocessor. Moreover, the processor 270 may include multiple processors. The memory 290 is representative of the overall hierarchy of memory devices containing the software and data used to implement various functions as described herein. The memory 290 may include, but is not limited to, the following types of devices: cache, ROM, PROM, EPROM, EEPROM, flash, Static RAM (SRAM), and Dynamic RAM (DRAM).

As shown in FIG. 2C, the memory 290 may hold various categories of software and data, such as an operating system 293. The operating system 293 can control operations of the instrument 10. In particular, the operating system 293 may manage the resources of the instrument 10 and may coordinate execution of various programs by the processor 270.

In some embodiments, the instrument 10 may include at least one reflecting surface 312/313 (FIG. 3A) that is configured to reflect the light 20L from the UV laser 20LS to the target 230T. Moreover, one or more actuators 280 may be coupled to the reflecting surface 312 and configured to adjust a tilt of the reflecting surface 312 to adjust the light 20L from the UV laser 20LS to the second position at the target 230T. In particular, the reflecting surface(s) 312/313 and/or a lens 311 (FIG. 3A) may be adjusted to focus a signal (e.g., the light 20L) to a spot associated with the target 230T. Although the UV laser 20LS is provided an example, which may also be used for MALDI-TOF, any laser 20LS can be used as long as the camera 240C is sensitive to the emitted wavelength of the laser 20LS. Moreover, in some embodiments, a material may be used that fluoresces under the influence of the laser 20LS. As such, the camera 240C may additionally or alternatively be sensitive to the wavelength of the light emitted by the fluorescence event.

Additionally or alternatively, the ion optics system 220 may include one or more apertures 314 (FIG. 3A), and the chamber 210 may include a stage 315 (FIG. 3A) having the target 230T thereon. In some embodiments, a processor 270 may be configured to control movement of the stage 315 to align a fiducial feature 315F (FIG. 3B) of the stage 315 with the light 20L and with the aperture(s) 314 of the ion optics system 220.

Figure 3A:
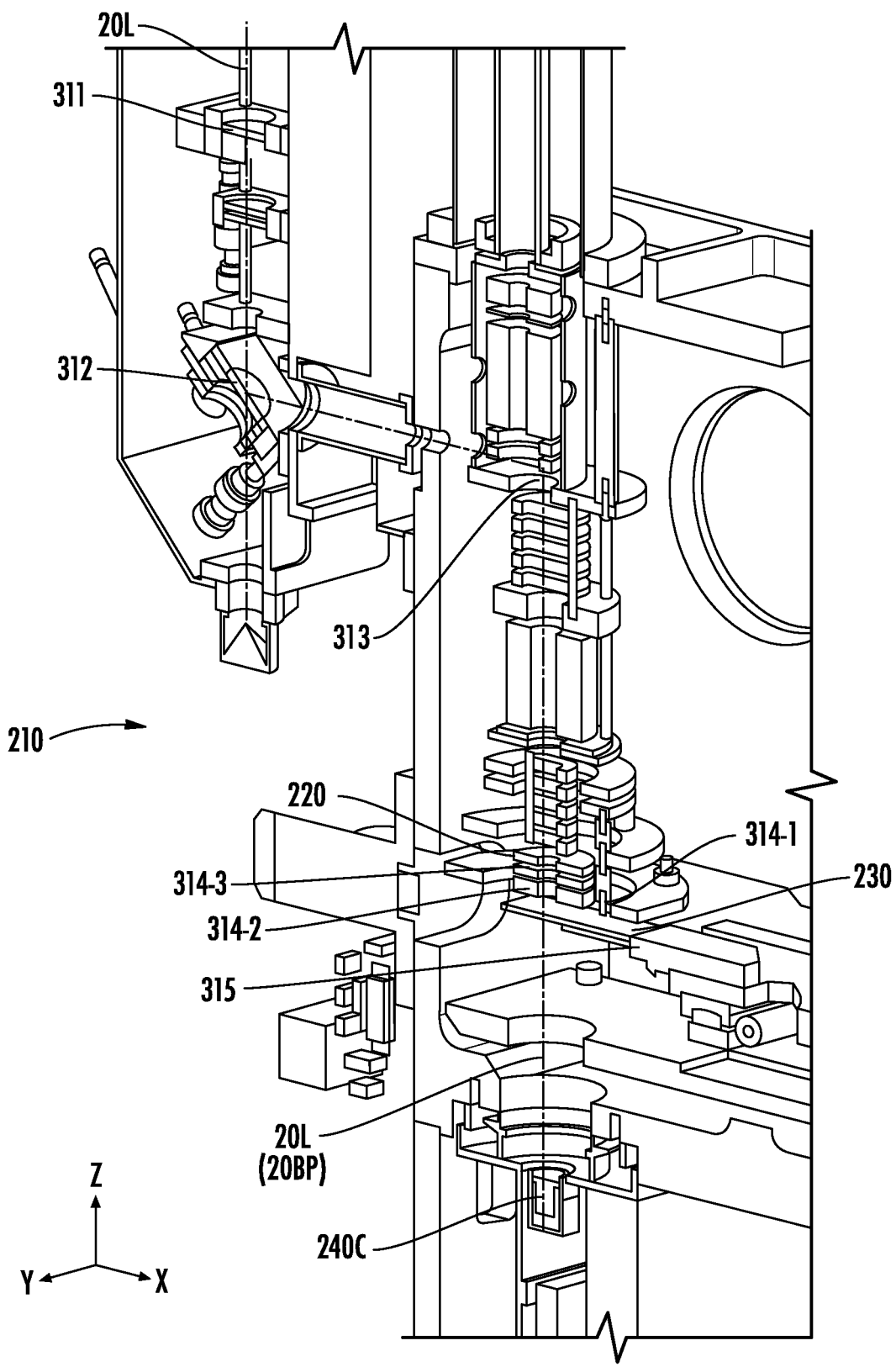
FIG. 3A illustrates a partial section perspective view inside a chamber of an instrument, according to embodiments of the present invention.

FIG. 3A illustrates a partial section perspective view inside a chamber 210 of an instrument 10. The chamber 210 may include a focusing lens 311, which may be coupled to an actuator 280 (FIG. 2B) and configured to adjust the focus of a signal (e.g., the light 20L). The instrument 10 may also include first and second reflecting surfaces 312 and 313. The first reflecting surface 312 may be outside the chamber 210 and may reflect a portion of an incident beam into the chamber 210. The first reflecting surface 312 may be a turnable (i.e., adjustable) reflecting surface (or beamsplitter) coupled to one or more actuators 280 (FIG. 2B) that can be used to tilt the reflecting surface 312 to steer the incident beam. The second reflecting surface 313, which may be inside the chamber 210, may also be a turnable reflecting surface/prism. In some embodiments, however, the second reflecting surface 313 may not be turnable. Accordingly, the second reflecting surface 313 may be fixed within the chamber 210 to provide a change of direction for the reflected incident beam.

The light 20L may pass from the lens 311 to the first reflecting surface 312 to the second reflecting surface 313 and then through the ion optics system 220. For example, the light 20L may pass through one or more apertures 314 (e.g., first, second, and third apertures 314-1, 314-2, and 314-3) of the ion optics system 220, through a target region (e.g., including a target 230T), and onto a camera 240C. In particular, FIG. 3A shows a beam path 20BP of the light 20L as it travels through the sample plate 230 toward the camera 240C. The sample plate 230 may be on an x-y stage 315 that supports the sample plate 230 without obstructing the beam path 20BP of the light 20L. As the light 20L detected or viewed by the camera 240C can cause the processor(s) 270 (FIG. 2B) to adjust the alignment of the light 20L from the light source 20, the camera 240C may be referred to herein as an "alignment camera."

As shown, the beam path 20BP of the light 20L extends in a z-direction to the sample plate 230 and the camera 240C. A sensor of the camera 240C may face upward in the z-direction toward the x-y stage 315, which extends in an x-direction and a y-direction that are perpendicular to each other and to the z-direction. Although the camera 240C is shown as being mounted below (in the z-direction) the vacuum chamber 210, the camera 240C may alternatively be mounted elsewhere and used with optics allowing viewing of the alignment of the light 20L of the light source 20. Moreover, a target 230T that is free of any samples thereon may, in some embodiments, be on the x-y stage 315 during alignment. The beam path 20BP may thus extend through a target 230T other than the sample plate 230.

Figure 3B:
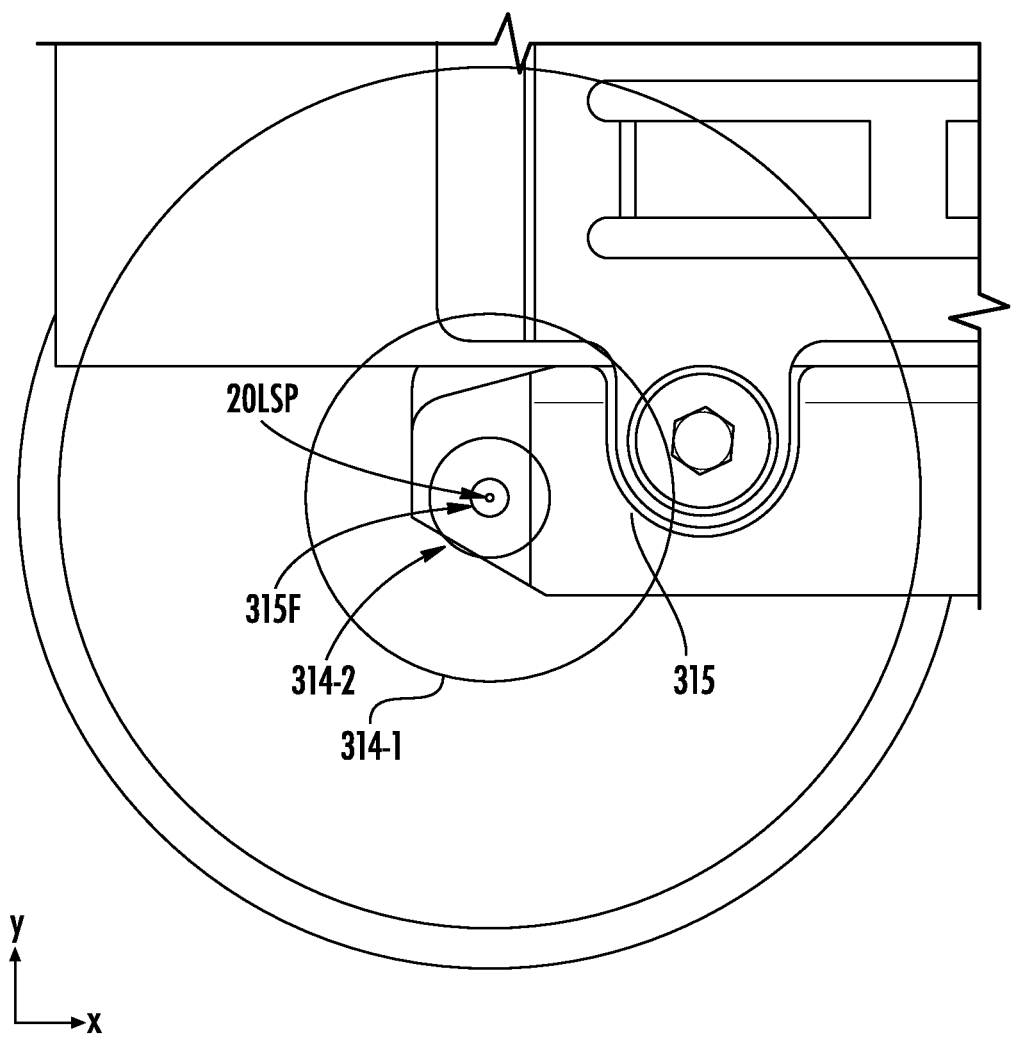
FIG. 3B illustrates a view into the chamber of FIG. 3A from the perspective of a camera, according to embodiments of the present invention.

FIG. 3B illustrates a view into the chamber 210 of FIG. 3A from the perspective of a camera 240C. In some embodiments, the light source 20 may be a laser 20LS whose light 20L provides a laser spot 20LSP that is seen by the camera 240C. Specifically, when the laser spot 20LSP is in the field of view of the camera 240C, the laser spot 20LSP may appear as an object in an image produced by the camera 240C. For example, the laser spot 20LSP that is seen by the camera 240C may be at a defined location (e.g., at the target 230T) in the chamber 210.

Moreover, although some examples herein describe the UV laser 20LS, a Light Emitting Diode (LED) or other light source 20, with or without optics, may be used as long as the size of the spot 20LSP resulting at the imaging plane is sufficient for precise alignment of the light source 20. The plane viewed in FIG. 3B by the camera 240C is an X-Y plane that is provided by the x-direction and the y-direction that are perpendicular to the z-direction of FIG. 3A.

As shown in FIG. 3B, the camera 240C can view the x-y stage 315. In particular, FIG. 3B illustrates that the camera 240C is viewing the laser spot 20LSP as being aligned with, or otherwise on, a fiducial feature 315F of the stage 315.

The fiducial feature 315F may be on or around a portion of the stage 315 that is optically transmissive (e.g., translucent or transparent) to the light 20L. For example, the stage 315 may include a portion 315TP (FIG. 3C) comprising an aperture, and/or an optically-transmissive material, through which the light 20L can pass to the camera 240C. The fiducial feature 315F may have a wider diameter than the laser spot 20LSP. Moreover, the first and second apertures 314-1 and 314-2 of the ion optics system 220 may each have a wider diameter than the fiducial feature 315F. As shown, the first aperture 314-1 may have a wider diameter than the second aperture 314-2. In some embodiments, additional (e.g., fourth, fifth, and so on) apertures 314 of the ion optics system 220 through which the light 20L passes to the camera 240C may be provided and aligned in the z-direction.

Figure 3C:
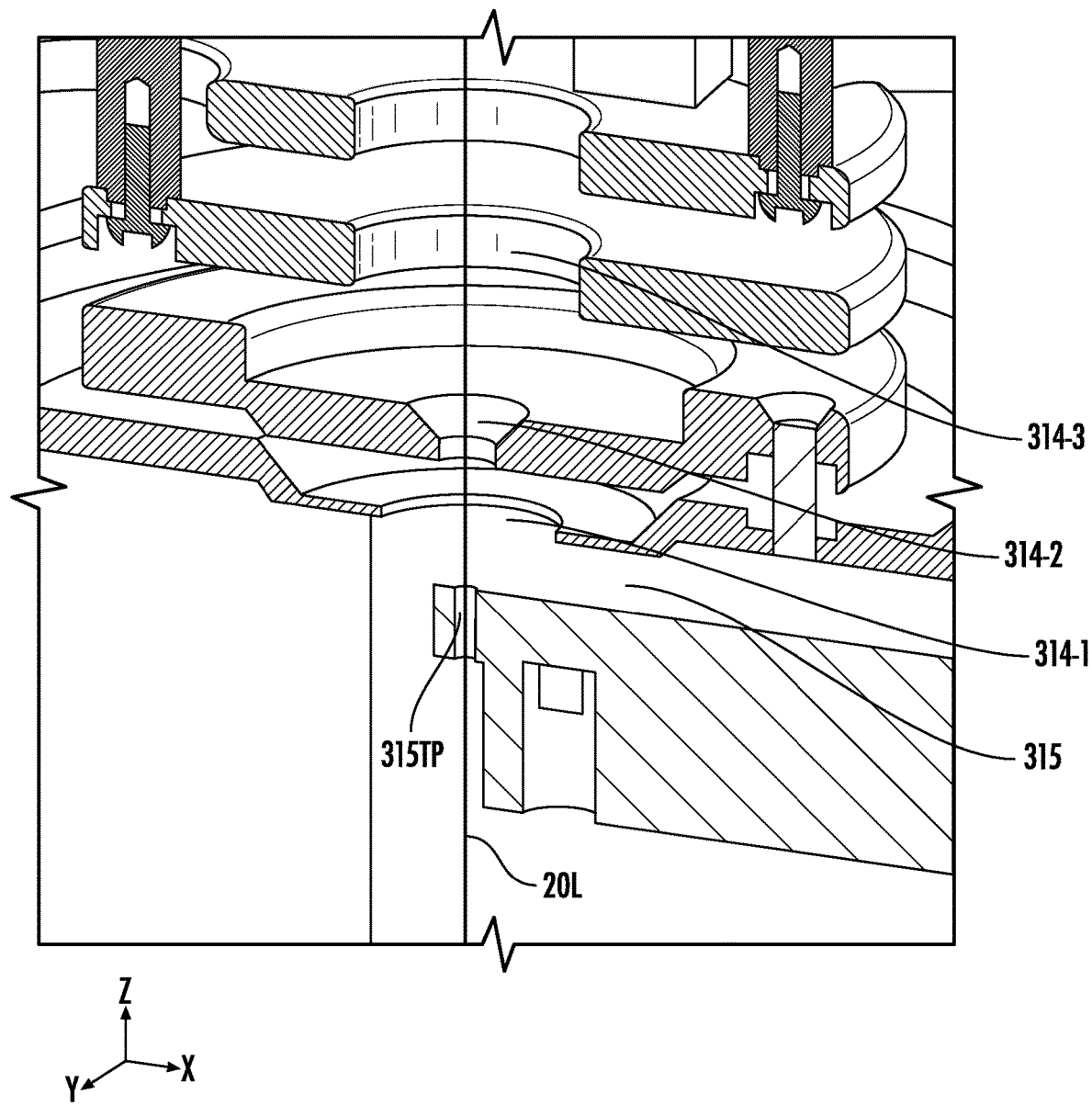
FIG. 3C illustrates an enlarged view of the chamber shown in FIG. 3A with a signal passing through one or more apertures of FIG. 3A, according to embodiments of the present invention.

FIG. 3C illustrates an enlarged view of the chamber 210 shown in FIG. 3A with a signal (e.g., the light 20L) passing through one or more apertures 314 of FIG. 3A. In particular, FIG. 3C shows that the sample plate 230 is absent from the stage 315. Accordingly, the alignment described herein may be performed while a sample is absent from the stage 315. As shown in FIG. 3C, the light 20L passes through the first, second, and third apertures 314-1, 314-2, and 314-3 of the ion optics system 220 and then through the portion 315TP of the stage 315 that allows the light 20L to reach the camera 240C. In some embodiments, the portion 315TP may be a substantially-circular window (e.g., an open aperture) in a base plate of the x-y stage 315. The substantially-circular window may be concentric with the laser spot 20LSP when the light 20L is properly focused.

One or more apertures 314 may have a tapered channel (i.e., the channel may have multiple diameters). For example, the second aperture 314-2 is shown in FIG. 3C as having a tapered channel. A minimum (e.g., narrowest) diameter of each of the first, second, and third apertures 314-1, 314-2, and 314-3, however, may be wider than a diameter of the portion (e.g., window/channel) 315TP in the x-y stage 315.

In some embodiments, the fiducial feature 315F in FIG. 3B may be the channel 315TP in FIG. 3C. As such, the fiducial feature 315F can move with the stage x-y stage 315. The feature 315F may allow the system to know where to move the stage 315 to direct the laser spot 20LSP upon a given sample location. The laser spot centroid 20LSP can be first aligned with the apertures 314 using the camera 240C such that the centroid 20LSP is concentric with the apertures 314. The stage 315 can then be positioned such that the fiducial feature 315F is concentric with both the laser spot centroid 20LSP and the apertures 314. The resulting stage position can then be stored as an origin position (0,0). Because the position of a given location on a sample slide 230 inserted onto the stage 315 is known relative to the position of the fiducial feature 315F, and because the fiducial feature 315F may not move relative to the sample slide 230 during operation, the stage 315 can reliably position a given sample location for acquisition.

Figure 3D:
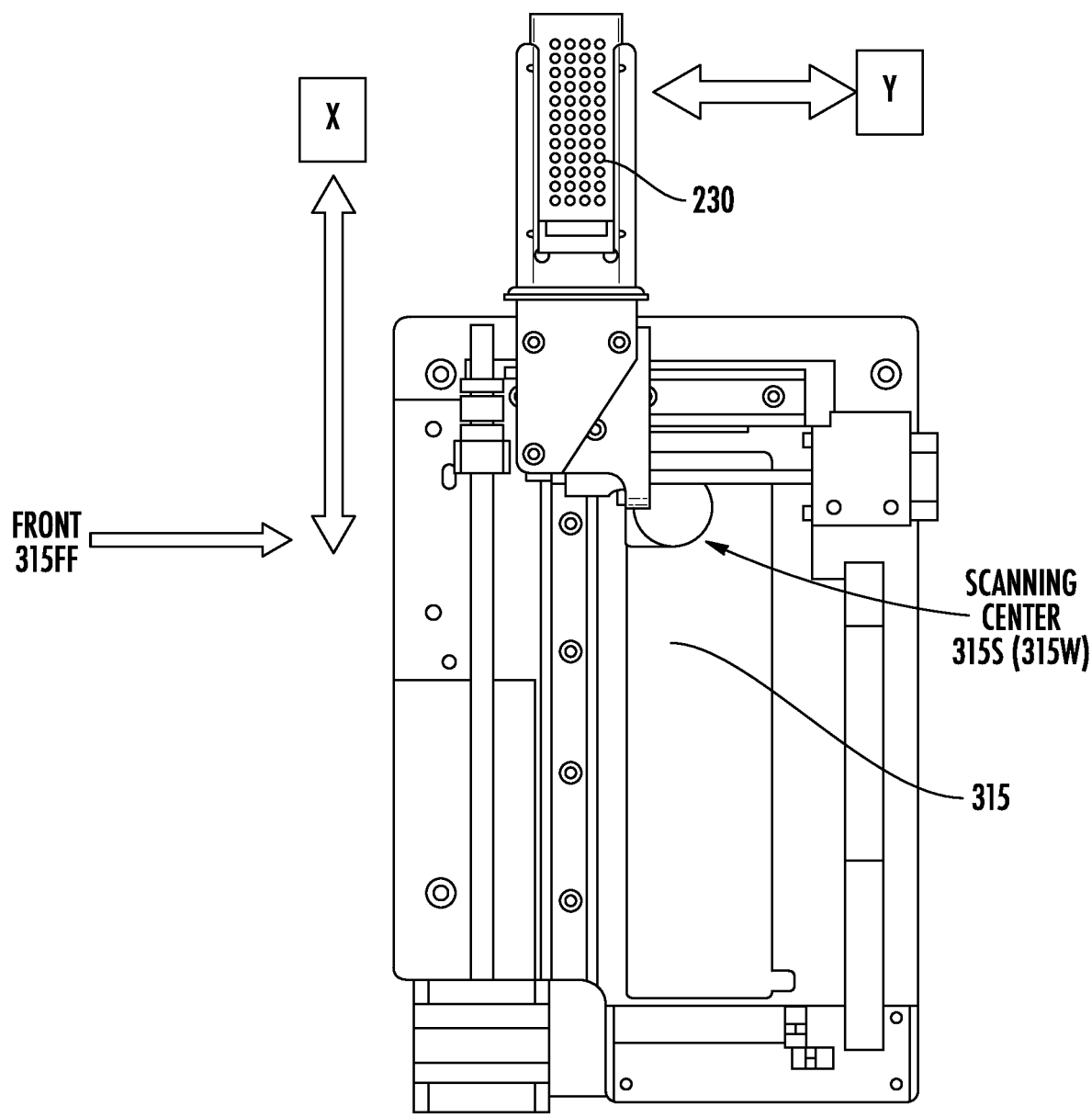
FIG. 3D is a plan view of an x-y stage that can reside inside a chamber of an instrument, according to embodiments of the present invention.

FIG. 3D is a plan view of an x-y stage 315 that can reside inside a chamber 210 of an instrument 10. As shown in FIG. 3D, a sample slide 230 of the instrument 10 may travel in the x-direction and the y-direction relative to a scanning center 315S and a front 315FF of the stage 315. As an example, the sample slide 230 may travel to be aligned in the z-direction with the scanning center 315S, which may comprise an open thru-channel 315W through which the light 20L from the light source 20 may pass. For example, the scanning center 315S may comprise the portion 315TP of the stage 315 that is shown in FIG. 3C.

The window 315W can be about 43 mm in diameter, which is large enough to provide a clear view of the underside of the x-y stage 315. The channel 315TP can be about 1.0 mm in diameter and about 4 mm long/deep. Both the window 315W and the channel 315TP can be circular. This shape may be particularly advantageous for the channel 315TP, especially if apertures 314 are used.

Figure 3E:
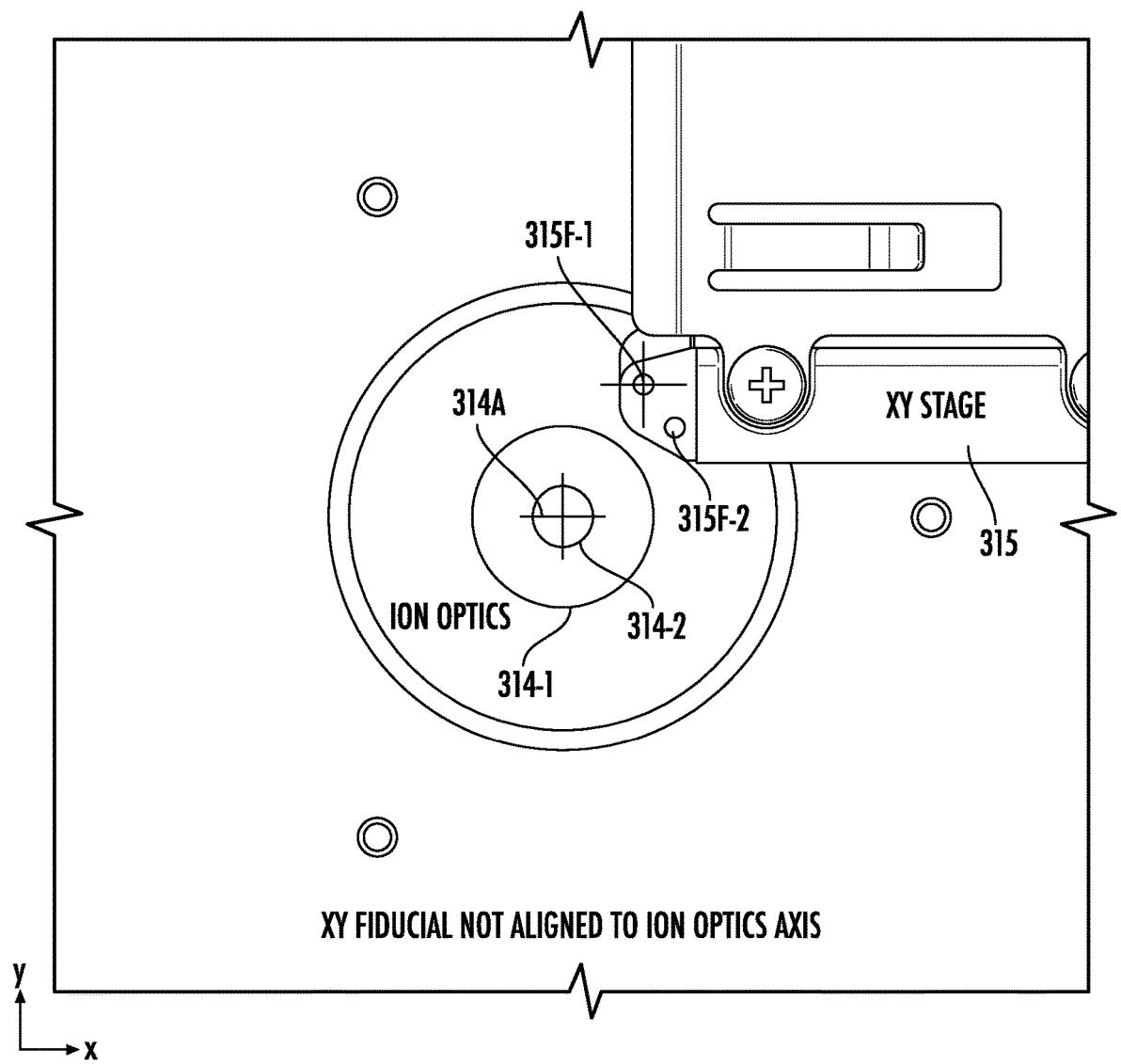
FIGS. 3E and 3F illustrate views into the chamber of FIG. 3A from the perspective of a camera, according to embodiments of the present invention.
Figure 3F:
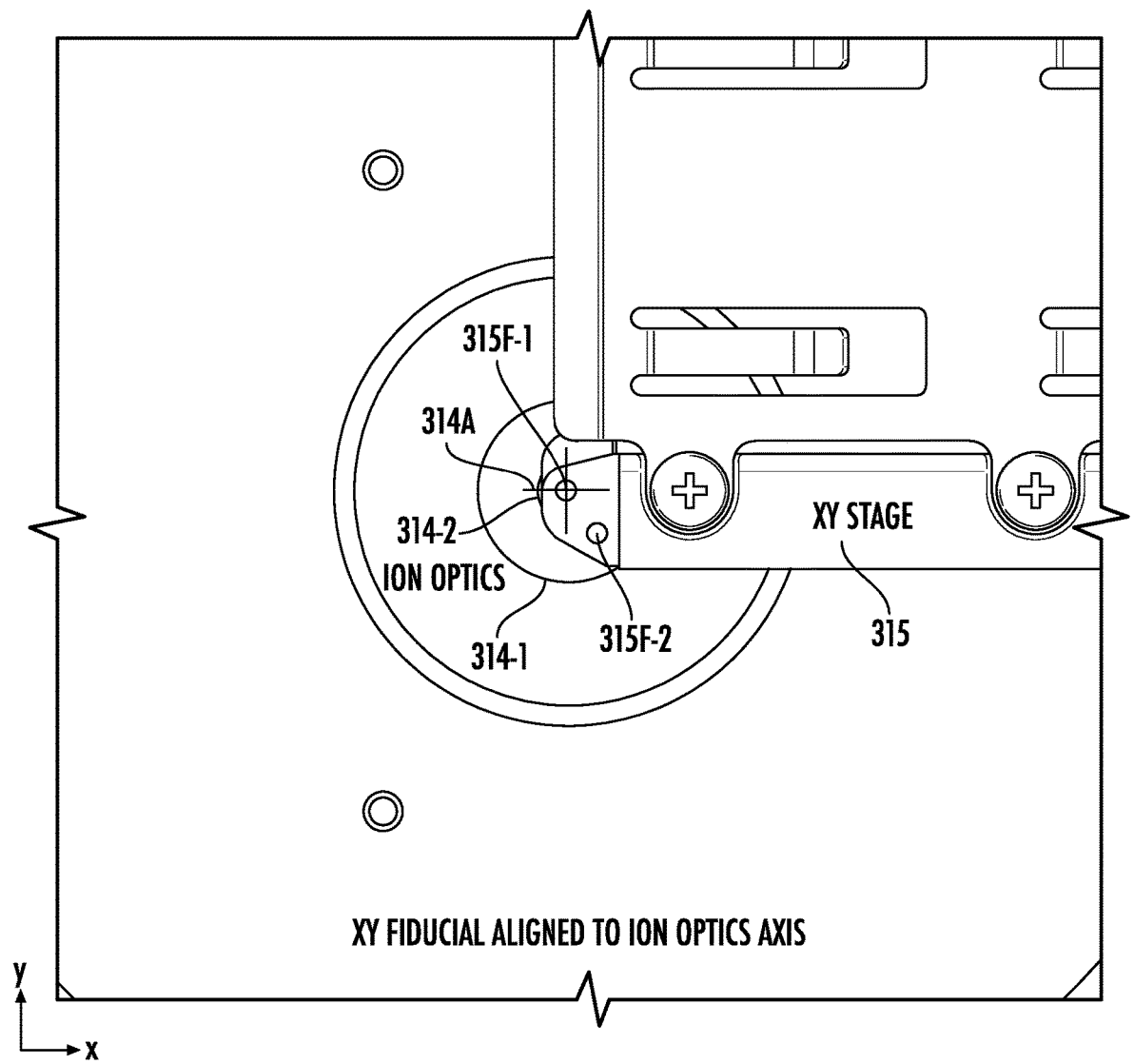

FIGS. 3E and 3F illustrate views into the chamber 210 of FIG. 3A from the perspective of a camera 240C, according to embodiments of the present invention. In particular, FIGS. 3E and 3F illustrate non-through-hole fiducial features 315F-1 and 315F-2 on the xy-stage 315. Accordingly, rather than using a through-hole aperture on the xy-stage 315, the non-through-hole fiducial features 315F-1 and 315F-2 provide two opaque fiducial features for the camera 240C to detect.

FIG. 3E shows an arrangement in which neither of the non-through-hole fiducial features 315F-1 and 315F-2 is aligned to an ion optics axis 314A. FIG. 3F, on the other hand, shows that the non-through-hole fiducial feature 315F-1 is aligned to the ion optics axis 314A. The ion optics axis 314A and the non-through-hole fiducial feature 315F-1 are highlighted in FIGS. 3E and 3F via crosshairs that may not be visible during use of the instrument 10.

The non-through-hole fiducial features 315F-1 and 315F-2 may be implemented by press-fitting an opaque thermoplastic, such as black DELRIN® resin into through holes drilled into a reflective/non-black metal (e.g., aluminum) arm of the xy-stage 315, thus providing sufficient contrast for the camera 240C to easily detect. Though the non-through-hole fiducial feature 315F-1 is the only fiducial feature that is aligned in FIG. 3F, any arrangement of any number of any kind of shape of non-through-hole fiducial features can be used. Further, using multiple non-through-hole fiducial features allows for angular corrections to be made.

Because the non-through-hole fiducial features 315F-1 and 315F-2 are optically opaque, they are not necessarily used to directly align the xy-stage 315 to a laser spot 20LSP. The laser spot 20LSP may instead be aligned with the center of the ion optics aperture(s) 314-1/314-2. The xy-stage 315 may be separately aligned with the center of the ion optics aperture(s) 314-1/314-2. Small adjustments (offsets) may later be made to fine-tune spectra acquisition performance (i.e. the best-quality signal/results may not necessarily coincide with perfect alignment of the components and features mentioned above as detected by the imaging system).

Referring to FIGS. 1A-3F, the instrument 10 may, in some embodiments, be a mass spectrometer 10M, and the light source 20 may be a laser 20LS of the mass spectrometer 10M. Accordingly, the light 20L may provide a laser beam of the laser 20LS, and the chamber 210 may provide an ionization chamber of the mass spectrometer 10M. The mass spectrometer 10M may include a reflecting surface 312 outside the ionization chamber, and the reflecting surface 312 may be configured to reflect the laser beam from the laser 20LS to the target 230T inside the ionization chamber. Moreover, the sensor 240 may comprise a sensor of a camera 240C that is configured to capture at least an image of the laser beam (e.g., in addition to capturing the laser beam image, the sensor of the camera 240C may be configured to capture a reference frame), and the processor 270 may be configured to control adjustment of a tilt of the reflecting surface 312 to adjust the laser beam from a first position at the target 230T to a second position at the target 230T. For example, the second position at the target 230T may be a predetermined position, and the first position may be a measured position that is compared with the predetermined second position to determine whether to adjust the laser beam. In some embodiments, the first and second positions may be related to each other by a centroid/number of pixels traversed.

The method(s) described herein may be used for mass spectrometry systems. For example, it may be desirable to isolate a user when controlling a laser spot 20LSP size by varying the focus of a laser 20LS. Any system/instrument in which it is desirable for a user to be isolated from a process, however, may use the method(s). Such processes may involve high vacuum pressure, high voltages, and hazardous laser energy that, for safety and quality reasons, make user protection a concern. Additionally or alternatively, such processes may involve the use of hazardous vapors or other substances for which containment or protection from contamination is desirable.

FIGS. 4A-4H illustrate flowcharts of example methods for operating the instrument 10. In some embodiments, the memory 290 of FIG. 2C may be a non-transitory computer readable storage medium including computer readable program code therein that when executed by the processor(s) 270 causes the processor(s) 270 to perform the method(s) of any of FIGS. 4A-4H.

Figure 4A:
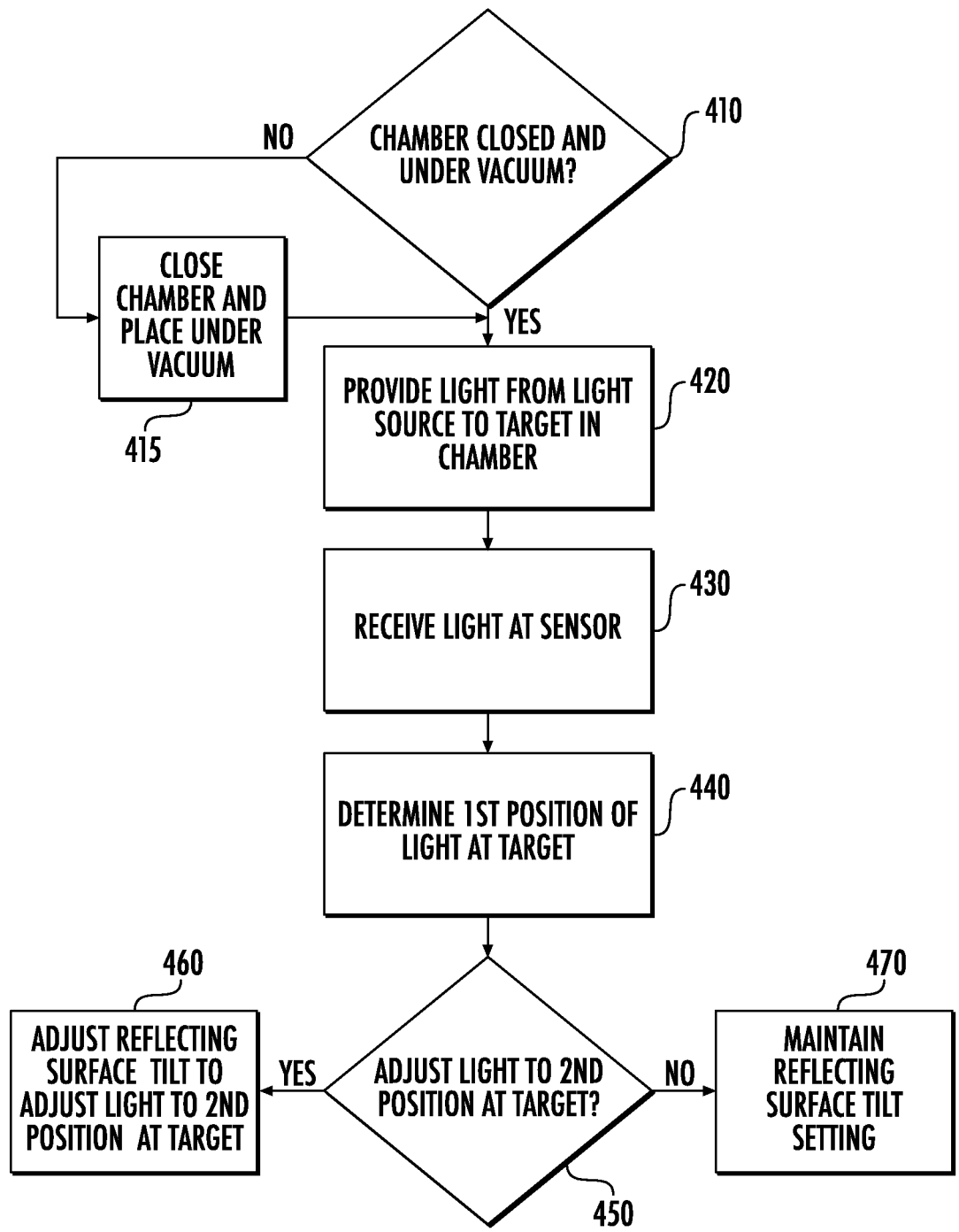
FIGS. 4A-4H illustrate flowcharts of example methods for operating an instrument according to embodiments of the present invention.

Referring to FIG. 4A, the methods may include methods for aligning the light source 20 to the target 230T that is inside the instrument 10. In particular, the method shown in FIG. 4A may include providing (Block 420) light 20L from the light source 20 to the target 230T in a chamber 210 that is closed and under vacuum pressure (Blocks 410, 415). The method shown in FIG. 4A may then include receiving (Block 430) the light 20L at a sensor 240 while the chamber 210 is closed and under vacuum pressure (Blocks 410, 415). As illustrated in FIG. 2A, the operation(s) of Block 430 may, in some embodiments, be performed through the window 210W of the chamber 210. Moreover, the method may include determining (Block 440), using data from the sensor 240, a first position of the light 20L at (or adjacent) the target 230T, and determining (Block 450) whether to adjust the light 20L to a second position at the target 230T.

As shown in FIG. 4A, the method may include adjusting (Block 460) a tilt of the reflecting surface 312 (and/or a lens 311 or other optical component) to adjust the light 20L from the light source 20 to the second position at the target 230T, in response to the operation(s) of Block 450. Accordingly, the light source 20 may be aligned to the target 230T that is inside the instrument 10 based on the operations of Blocks 410-460. Alternatively, the tilt setting of the reflecting surface 312 (and/or the lens 311) may be maintained (Block 470) if it does not need to be adjusted (Block 450), such as when the first position at the target 230T is already aligned with, or is within a threshold distance of, the second position.

As discussed herein, the light source 20 may, in some embodiments, comprise a UV laser 20LS. Accordingly, operation(s) of providing (Block 420) the light 20L may include providing (e.g., firing) light 20L from the UV laser 20LS to the reflecting surface 312 outside the chamber 210 that reflects the light 20L from the UV laser 20LS to the target 230T. Operation(s) of adjusting (Block 460) the tilt of the reflecting surface 312 thus may be performed to adjust the light 20L from the UV laser 20LS to the second position at the target 230T. In particular, if the light 20L, which is incident on the reflecting surface 312, is not aligned (Block 450), then the tilt of the reflecting surface 312 can be adjusted (Block 460) to increase the alignment of the light 20L with respect to a position/location of the target 230T.

Figure 4B:
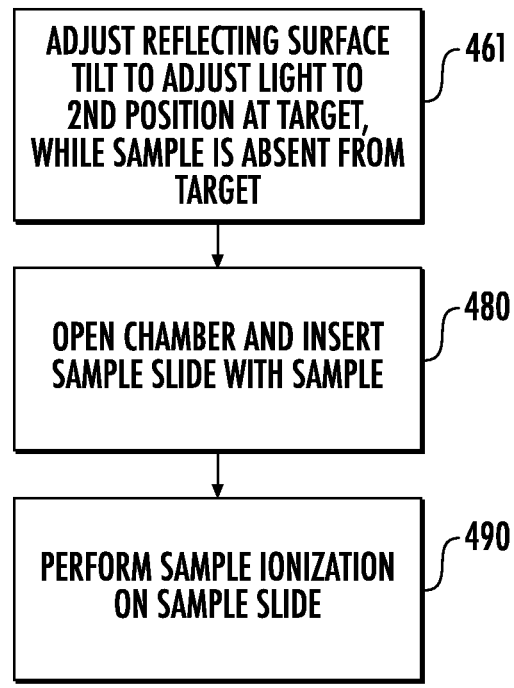

Referring to FIG. 4B, operation(s) of adjusting (Block 460) the tilt of the reflecting surface 312 may be performed while the target 230T is free of any sample thereon (Block 461). For example, the target 230T may be a blank/test slide or may simply be a particular location/position on the stage 315 (i.e., the stage 315 may have no slide thereon). Subsequently, the method of FIG. 4B may include opening (Block 480) the chamber 210 and inserting a sample slide 230 having a sample thereon. The method may then include performing (Block 490), using the UV laser 20LS, sample ionization of the sample while the sample is on the sample slide 230. In particular, after performing the operation(s) of Block 460 or Block 470 of FIG. 4A, the same light source 20 (e.g., the UV laser 20LS) that is used for alignment verification/adjustment in FIG. 4A may then be used to perform sample ionization (Block 490) within the instrument 10.

Figure 4C:
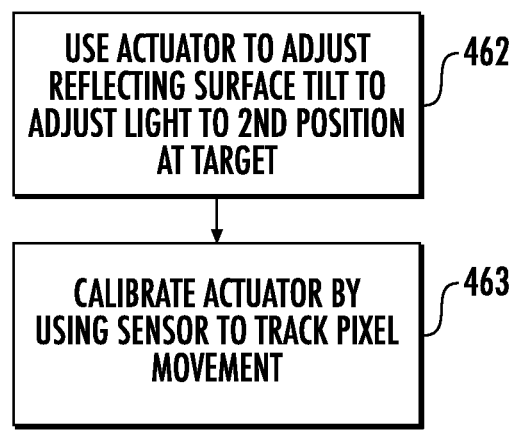

Referring to FIG. 4C, operation(s) of adjusting (Block 460) the tilt of the reflecting surface 312 may be performed using an actuator 280 that is coupled to the reflecting surface 312 (Block 462). The operation(s) of Block 462 may include electronically directing/controlling the actuator 280 to adjust the tilt of the reflecting surface 312 so that the light 20L is adjusted to the second position at the target 230T. Moreover, in some embodiments, the method may include calibrating (Block 463) movement of the actuator 280 by using the sensor 240 to determine/track pixel movement/change resultant from forward or reverse operation of the actuator 280.

Figure 4D:
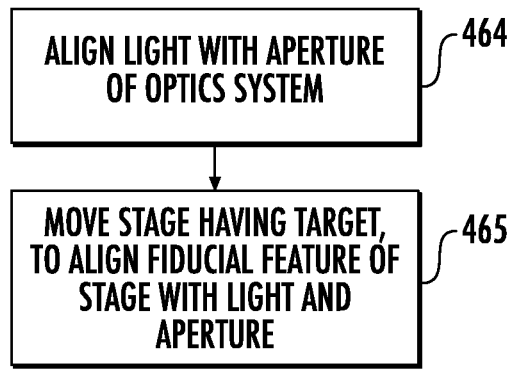

Referring to FIG. 4D, operation(s) of adjusting (Block 460) the tilt of the reflecting surface 312 may include aligning (Block 464) the light 20L with one or more apertures 314 of the ion optics system 220 of the instrument 10. For example, the operation(s) of Block 464 may include centering, or otherwise positioning, the light 20L in the aperture(s) 314. Moreover, the method may include moving (Block 465) a stage 315 having the target 230T thereon, to align a fiducial feature 315F of the stage 315 with the light 20L and with the aperture(s) 314 of the ion optics system 220, after adjusting (Block 460/464) the tilt. Accordingly, after the operation(s) of Block 465, which may be performed using one or more actuators 280, the light 20L passes through the aperture(s) 314 onto the fiducial feature 315F.

Figure 4E:
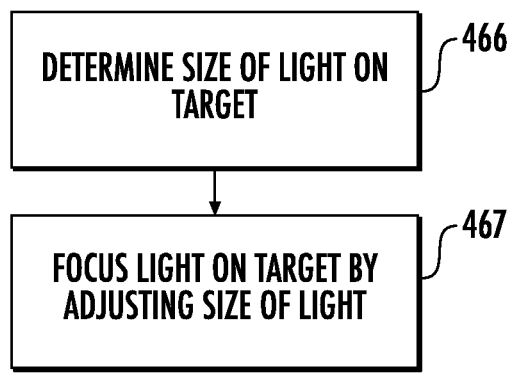

Referring to FIG. 4E, the method(s) herein may include determining (Block 466) a size (e.g., width) of the light 20L on the target 230T in pixels in an image captured by the camera 240C. For example, the operation(s) of Block 466 may include determining a radius or diameter of the laser spot 20LSP that is shown in FIG. 3B. The operation(s) of Block 466 may be performed before and/or after the operation(s) of Block 440. Moreover, the method of FIG. 4E may also include focusing (Block 467) the light 20L on the target 230T by adjusting the size (e.g., width) of the light 20L on the target 230T. For example, if a desired laser spot 20LSP size is known/predetermined, it can be compared with the measured laser spot size 20LSP, which can then be adjusted to match the desired size that is known/predetermined. In some embodiments, the focusing (Block 467) operation(s)

may be improved by modifying the optics used by the camera 240C and/or by increasing the resolution of the camera 240C.

Figure 4F:
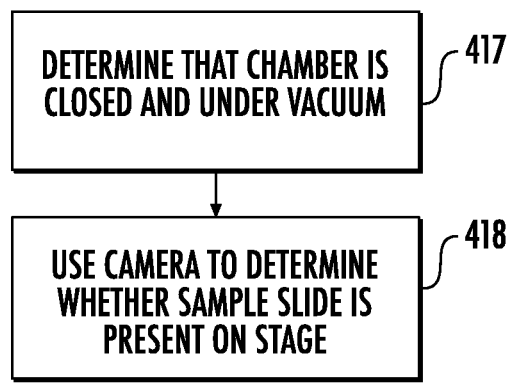

Referring to FIG. 4F, the method(s) herein may include determining (Block 418), via the camera 240C, whether a sample slide 230 is present on the stage 315, such as when the instrument 10 is a mass spectrometer 10M. For example the operation(s) of Block 418 may be performed by a processor 270 using data from the camera 240C. Moreover, the operation(s) of Block 418 may be performed in response to determining (Block 417) that the chamber 210 is closed and under vacuum pressure. As an example, the operation(s) of Block 417 may represent a YES decision in Block 410 of FIG. 4A or may represent completion of the operation(s) of Block 415 of FIG. 4A. Accordingly, the operation(s) of Blocks 417 and 418 may, in some embodiments, be performed before the operation(s) of Block 420 of FIG. 4A. For example, the operation(s) of Blocks 417 and 418 may be performed to confirm that a sample slide 230 is absent from the stage 315, which may be desirable when performing the alignment described herein.

As discussed herein, the instrument 10 may, in some embodiments, be a mass spectrometer 10M. Accordingly, the methods of FIGS. 4A-4E may be performed as methods for aligning a laser 20LS of a mass spectrometer 10M, and the method of FIG. 4F may be performed as a method for determining whether a sample slide 230 is present on an x-y stage 315 of a mass spectrometer 10M.

For example, the operation(s) of Block 420 of FIG. 4A may include providing a laser beam from the laser 20LS to a reflecting surface 312 that reflects the laser beam to a target 230T in an ionization chamber 210 while the ionization chamber 210 is closed and under vacuum pressure. The operation(s) of Block 430 of FIG. 4A may then include capturing an image (e.g., an image of a laser spot 20LSP) of the laser beam with a camera 240C while the ionization chamber 210 is closed and under vacuum pressure. In some embodiments, however, the operations of Blocks 420 and 430 of FIG. 4A may be performed without requiring that the ionization chamber 210 is closed and under vacuum pressure. Next, the operation(s) of Block 440 of FIG. 4A may include determining, using the image captured by the camera 240C, a first position of the laser beam at (or adjacent) the target 230T. Moreover, the operation(s) of Block 450 of FIG. 4A may include determining whether to adjust the laser beam to a second position at the target 230T, and the operation(s) of Block 460 of FIG. 4A may include adjusting a tilt of the reflecting surface 312 to adjust the laser beam to the second position at the target 230T.

In some embodiments, the sample(s) on the sample plate 230 may include a biosample from a patient, and analysis of the sample can be carried out by the instrument 10 to identify whether a defined protein or microorganism, such as bacteria, is in the sample for medical evaluation of the patient. For example, the instrument 10 may be a mass spectrometer 10M, and the analysis can identify whether any of about 150 (or more) different defined species of bacteria is in a sample, based on obtained spectra. The target mass range can be between about 2,000-20,000 Dalton.

The present invention advantageously provides for the laser 20LS (or other light source 20) to be aligned remotely, thus increasing the speed of the alignment process. In particular, the alignment may be performed without opening the vacuum chamber 210 to provide direct access by the user to the ion optics system 220 and alignment components. By reducing/eliminating the need to remove instrument panels from the instrument 10, the present invention may reduce both system downtime and the safety risk to the user.

Moreover, by allowing the ion optics system 220 to remain in place during alignment, the present invention protects the ion optics system 220 from possible misalignment that may otherwise occur during reassembly, and from damage that may otherwise occur during removal or reinsertion, of the ion optics system 220. Conventional systems, by contrast, may require direct user interaction with laser alignment optics, which may expose the user to a potential laser safety hazard and may risk misalignment of a laser beam.

Nor do conventional systems provide an objective manner of focusing a laser spot to the desired/appropriate size. Some embodiments of the present invention, however, provide for focusing the laser spot 20LSP by measuring and then adjusting its size. Accordingly, the present invention may allow the user to modify or verify alignment and/or focus of the laser 20LS without disturbing other components and/or settings of the system (i.e., components or settings of the instrument 10).

Furthermore, whereas conventional systems may provide for only indirectly viewing the position of a laser beam (e.g., by using the fluorescence from highlighter ink on a sample slide to view the beam position), some embodiments of the present invention provide for directly viewing the light 20L via the camera 240C.

The following is one non-limiting example of the methods described herein. In MALDI-TOF mass spectrometry, a UV laser 20LS may be used for sample ionization and deposition. The alignment of the laser spot 20LSP on the sample may significantly impact proper operation of the system/instrument 10. Accordingly, some embodiments of the present invention use data from a camera 240C to automatically align and/or focus the laser spot 20LSP, and/or to align an XY-stage (or "x-y stage") 315.

The camera 240C may be at a location below where a sample typically is in the instrument 10. While the XY-stage 315 includes or is free of any samples thereon, the laser 20LS may fire a laser beam that is incident on the camera 240C, and the processor 270 may use feedback from the camera 240C to align or focus the laser 20LS. The camera 240C views the ion optics system 220, identifies the aperture (s) 314, and, based on the known/predetermined size of the ion optics system 220 and the aperture(s) 314, aligns the laser 20LS. It may not be necessary, however, to identify every aperture 314. For example, identification of the aperture 314-3 (FIG. 3C) may be omitted.

If the laser beam from the laser 20LS is positioned correctly in the aperture(s) 314, then the correct position will be viewed by the camera 240C. Aligning the laser 20LS can involve moving the reflecting surface 312, and the camera 240C can provide real-time feedback when adjusting the laser 20LS.

The path 20BP of the laser beam may be perpendicular to the surface of a target 230T on the XY-stage 315. The laser beam also travels (in the z-direction) through the center of the aperture(s) 314, which may be a series of apertures 314 provided by an arrangement of the ion optics system 220. The center of the laser beam may thus be coaxial with the center(s) of the aperture(s) 314 and with a position/location on the target 230T. By placing a camera 240C with optics configured to view the laser beam at the end of this axis (e.g., the z-axis in FIG. 3A), and by integrating into the XY-stage 315 a fiducial feature 315F through which the laser beam may pass, the laser spot 20LSP may be relatively easily viewed. Moreover, although the scanning center 315S of the XY-stage 315 may be constant/fixed, the target 230T can, in some embodiments, be moved.

A turnable reflecting surface 312 and focusing lens 311 may be coupled to/fitted with electronic and remotely controllable actuators 280. The positions of these optical components (the reflecting surface 312 and lens 311) can thus be adjusted via software of the instrument 10. If a target position and a target spot size are known, the camera 240C can be used in conjunction with these actuators 280 to align and focus the laser spot 20LSP.

The laser spot 20LSP position as seen by the camera is first centered in the ion optics aperture(s) 314. Then, the XY-stage 315 can be moved such that the fiducial feature 315F is concentric with the laser beam (and thus also with the ion optics system 220). Because the position of the fiducial feature 315F is known relative to each sample location on a slide 230 held by the stage 315, the position of the stage 315 is stored (e.g., in the memory 290 of FIG. 2C), and the stage 315 is considered aligned. The laser 20LS can also be focused by quantifying the width of the laser spot 20LSP in pixels in an image captured by the camera 240C.

The X/Y position (i.e., the position in the x-direction and/or the y-direction of FIGS. 3A-3F) of the laser spot 20LSP is adjusted by one or more actuators 280 coupled to a turnable reflecting surface 312 (and/or to a lens 311). For example, a pair of the actuators 280 may be fitted to the reflecting surface 312. Moreover, the size of the laser spot 20LSP may be adjusted by an actuator 280 coupled/fitted to a focusing lens 311. A user can make these adjustments to the reflecting surface 312 and lens 311 manually via software of the instrument 10, or the software can automatically command/control adjustments as part of a closed-loop control scheme if automatic adjustment is desired. As an example, the lens 311 may be manually adjusted until the spot size is substantially circular and substantially close to a pre-determined diameter. In some embodiments, however, the adjustment(s) may be performed automatically. Moreover, adjustment of ellipticity of the laser spot 20LSP can be performed via x-y adjustment of an upstream lens.

In some embodiments, the actuators 280 may be piezoelectric actuators. The accuracy of piezoelectric actuators, however, can be undesirably low due to a variable change in physical position for a given number of steps or pulses. To account for this, the camera 240C can also be used to calibrate the positional piezoelectric actuators by counting the number of pixels moved when a given number of steps is commanded. Although this technique may be useful for piezoelectric actuators, it may also be used for other types of the actuators 280, such as stepper motors.

Motors, or other actuators 280, driving the tilt of the reflecting surface 312 may work differently when driving forward as opposed to driving backward. Accordingly, testing a large number of points forward and backward and then attempting to return to a particular setup may be difficult, as a large number (e.g., 500-2,000) of steps forward may not be equal to the same number of steps backward. Some embodiments of the present invention, however, provide a mechanism by which the centroid of the laser beam may be determined using data from the camera 240C. In particular, a calibration factor may be provided based on moving forward and backward, and this calibration factor may be used to calculate how to accurately adjust the laser beam in both the x-direction and the y-direction.

Figure 4G:
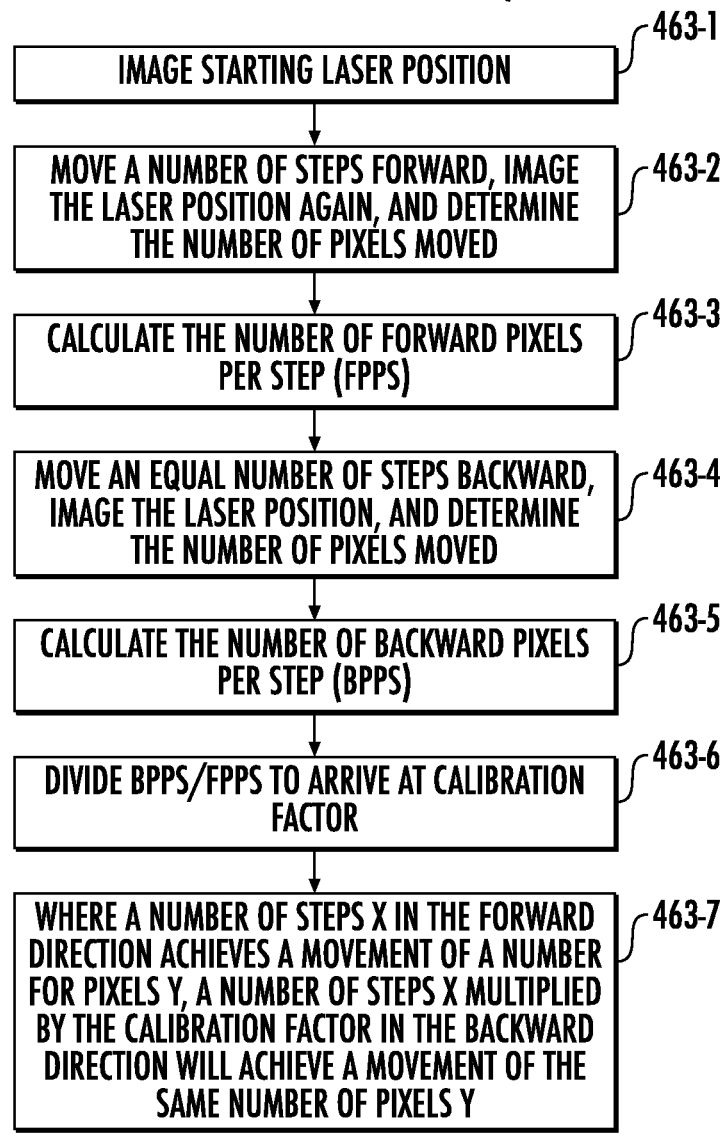

For example, FIG. 4G illustrates a flowchart of determining a calibration factor. Operations of determining the calibration factor may include capturing (Block 463-1), using data from the camera 240C (or other sensor 240), an image of a starting position of the laser 20LS.

The actuator 280/reflecting surface 312 may then be moved (Block 463-2) a number of steps forward, the forward position of the laser 20LS can be imaged (using data from the camera 240C), and the number of pixels moved can be determined. Next, the number of forward pixels per step (FPPS) can be calculated (Block 463-3). The actuator 280/reflecting surface 312 can be moved (Block 463-4) an equal number of steps backward, the backward position of the laser 20LS can be imaged (using data from the camera 240C), and the number of pixels moved can be determined. The number of backward pixels per step (BPPS) can then be calculated (Block 463-5), and the BPPS can be divided (Block 463-6) by the FPPS to provide the calibration factor. Moreover, where a number of steps X in the forward direction achieves a movement of a number of pixels Y, the number of steps X multiplied (Block 463-7) by the calibration factor in the backward direction can achieve a movement of the same number of pixels Y. In some embodiments, Block 463 of FIG. 4C may include one or more of the operations of FIG. 4G.

Figure 4H:
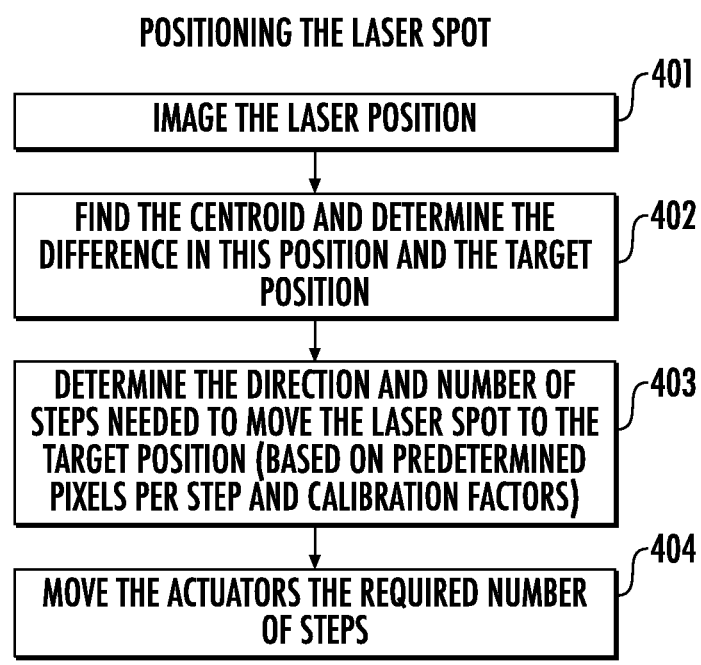

Referring to FIG. 4H, a flowchart is provided of positioning the laser spot 20LSP. Such positioning operations may include capturing (Block 401), using data from the camera 240C (or other sensor 240), an image of the position of the laser 20LS. Next, the operations may include locating (Block 402) a centroid of the laser beam, and determining a difference between the position of the laser 20LS and a target position. The operations may then include determining (Block 403) the direction and number of steps needed to move the laser spot 20LSP to the target position (based on predetermined pixels per step and calibration factor(s)). The actuator(s) 280 can then be moved (Block 404) the determined/required number of steps.

The camera 240C can also be used to determine whether a sample slide 230 is present on the stage 315. Accordingly, the need for an in-vacuum (i.e., internal to the chamber 210) presence sensor can be reduced/eliminated, which may reduce the number of wires in the system/instrument 10. Moreover, the laser 20LS used for the alignment discussed herein may be the same laser 20LS that is used for sample ionization. The present invention therefore may use existing components with minor/moderate additions to achieve highly-beneficial improvements.

In the figures, certain layers, components, or features may be exaggerated for clarity, and broken lines illustrate optional/removable features or operations unless specified otherwise. The terms "FIG." and "FIG." are used interchangeably with the word "Figure" in the application and/or drawings. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms "first," "second," etc. may be used herein to describe various elements, components, regions, layers, and/or sections, these elements, components, regions, layers, and/or sections should not be limited by these terms. These terms are only used to distinguish one element, component, region, layer, or section from another region, layer or section. Thus, a "first" element, component, region, layer, or section discussed below could be termed a "second" element, component, region, layer, or section without departing from the teachings of the present invention.

Spatially relative terms, such as "beneath," "below," "bottom," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass orientations of above, below and behind. The device may be otherwise oriented (rotated 90° or at other orientations) and the spatially relative descriptors used herein interpreted accordingly.

The term "about" refers to numbers in a range of +/−20% of the noted value.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, steps, operations, elements, and/or components, but do not preclude the presence or addition of one or more other features, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items. Moreover, the symbol "/" has the same meaning as the term "and/or."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

In some embodiments, the mass spectrometer 10M is configured to obtain an ion signal from a sample that is in a mass range of about 2,000 to about 20,000 Dalton.

The term "sample" refers to a substance undergoing analysis and can be any medium within a wide range of molecular weights. In some embodiments, the sample is being evaluated for the presence of microorganisms such as bacteria or fungi. The sample, however, can be evaluated for the presence of other constituents, including toxins or other chemicals.

The term "table top" refers to a relatively compact unit that can fit on a standard table top or counter top or occupy a footprint equivalent to a table top, such as a table top that has width-by-length dimensions of about 1 foot by 6 feet, for example, and which typically has a height dimension that is between about 1-4 feet. In some embodiments, the instrument/system resides in an enclosure or housing of 28 inches-14 inches (W)×28 inches-14 inches (D)×38 inches-28 inches (H). The flight tube 250 may have a length of about 0.8 meters (m). In some embodiments, longer or shorter lengths may be used. For example, the flight tube 250 may have a length that is between about 0.4 m and about 1 m.

The foregoing is illustrative of the present invention and is not to be construed as limiting thereof. Although a few example embodiments of this invention have been described, those skilled in the art will readily appreciate that many modifications are possible in the example embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A method for aligning a laser of a mass spectrometer, the method comprising:
providing a laser beam from the laser to a target location in an ionization chamber;
capturing an image of the laser beam with a camera, wherein the laser beam that is captured by the camera passes from at least one reflecting surface and/or lens to the camera through at least one ion optics aperture;
determining, using the image captured by the camera, a first position of the laser beam at the target location;
determining whether to adjust the laser beam to a second position at the target location; and
adjusting the laser beam to the second position at the target location,
wherein the aligning the laser is performed without disturbing other components and/or settings of the mass spectrometer.

2. The method of claim 1,
wherein an end portion of the ionization chamber comprises a window that is between the target location and the camera, and
wherein the capturing the image of the laser beam comprises capturing the image of the laser beam at the camera through the window of the ionization chamber.

3. The method of claim 1, wherein the capturing the image of the laser beam comprises capturing an image of a laser spot of the laser beam at a defined location in the ionization chamber while the ionization chamber is closed and under vacuum pressure.

4. The method of claim 1, wherein the adjusting the laser beam to the second position at the target location comprises adjusting a tilt of the at least one reflecting surface, while the target location comprises a location that is free of any sample thereon.

5. The method of claim 1, further comprising:
determining that no slide is present on a stage of the mass spectrometer, before the providing the laser beam from the laser to the target location.

6. A mass spectrometer comprising:
a light source; and
a chamber enclosing a target location for light of the light source;
a sensor configured to receive the light, wherein the sensor is, or comprises a sensor of, a camera that is configured to view the light; and
a processor configured to:
determine, using data from the sensor, a first position of the light at the target location;
determine whether to adjust the light to a second position at the target location; and
responsive to determining that the chamber is closed, determine, using data from the camera, that no slide is present on an x-y stage of the mass spectrometer, before the light source provides the light; wherein the adjustment of the light is performed without disturbing other components and/or settings of the mass spectrometer.

7. The mass spectrometer of claim 6, wherein the light source comprises an UltraViolet (UV) laser, the mass spectrometer further comprising:
a reflecting surface that is configured to reflect the light from the UV laser to the target location; and
an actuator coupled to the reflecting surface and configured to adjust a tilt of the reflecting surface to adjust the light from the UV laser to the second position at the target location.

8. The mass spectrometer of claim 6,
wherein the UV laser is configured to perform ionization of a sample on a sample slide in the chamber, and
wherein the chamber is under vacuum pressure.

9. The mass spectrometer of claim 6, wherein an end portion of the chamber comprises a window that is between the target location and the sensor.

10. The mass spectrometer of claim 6, wherein the x-y stage has a base plate with a circular open aperture that is between the camera and the ion optics system.

11. The mass spectrometer of claim 6, further comprising:
an ion optics system comprising at least one aperture,
wherein the x-y stage comprises the target location thereon, and
wherein the processor is configured to control movement of the x-y stage to align a fiducial feature of the x-y stage with the light and with the at least one aperture of the ion optics system.

12. The mass spectrometer of claim 6, wherein:
the light source comprises a laser of the mass spectrometer;
the light comprises a laser beam of the laser;
the chamber comprises an ionization chamber of the mass spectrometer;
the mass spectrometer comprises a reflecting surface, the reflecting surface being configured to reflect the laser beam from the laser to the target location; and
the processor is configured to control adjustment of a tilt of the reflecting surface to adjust the laser beam to the second position at the target location.

13. A method for an instrument comprising a light source, the method comprising:
providing light from the light source to a target location in a process chamber;
receiving the light at a sensor, wherein the sensor is, or comprises a sensor of, a camera that views the light;
determining, using data from the sensor, a first position of the light at the target location; and
determining whether to adjust the light to a second position at the target location,
wherein the instrument comprises a mass spectrometer, and
wherein the method further comprises, responsive to determining that the process chamber is closed, determining, via the camera, that no slide is present on an x-y stage of the mass spectrometer, before providing the light from the light source.

14. The method of claim 13,
wherein the light source comprises a laser,
wherein the providing light comprises providing the light from the laser to a reflecting surface that reflects the light from the laser to the target location, and
wherein the method further comprises adjusting a tilt of the reflecting surface to adjust the light from the laser to the second position at the target location.

15. The method of claim 14,
wherein the laser comprises an UltraViolet (UV) laser,
wherein the adjusting the tilt of the reflecting surface is performed while the target location comprises a location that is free of any sample thereon, and
wherein the method further comprises performing, using the UV laser, sample ionization of a sample on a sample slide in the process chamber.

16. The method of claim 14,
wherein the adjusting the tilt comprises electronically directing an actuator coupled to the reflecting surface to adjust the tilt, and
wherein the method further comprises calibrating movement of the actuator by using the sensor to determine pixel change resultant from forward or reverse operation of the actuator.

17. The method of claim 14,
wherein the adjusting the tilt comprises aligning the light with at least one aperture of a charged-particle optics system of the instrument,
wherein the x-y stage comprises the target location thereon, and
wherein the method further comprises moving the x-y stage comprising the target location thereon, to align a fiducial feature of the stage with the light and with the at least one aperture of the charged-particle optics system, after adjusting the tilt.

18. The method of claim 13,
wherein an end portion of the process chamber comprises a window that is between the target location and the sensor, and
wherein the receiving the light comprises receiving the light at the sensor through the window of the end portion of the process chamber.

19. The method of claim 13, further comprising determining a size of the light on the target location in pixels in an image captured by the camera.

20. The method of claim 13, further comprising:
aligning the light with at least one aperture of an ion optics system of the instrument, wherein the x-y stage comprises the target location thereon; and
moving the x-y stage comprising the target location thereon, to align a fiducial feature of the x-y stage with the light and with the at least one aperture of the ion optics system.

* * * * *